(12) United States Patent
Wu et al.

(10) Patent No.: US 11,019,615 B2
(45) Date of Patent: May 25, 2021

(54) DATA TRANSMISSION METHOD AND RELATED APPARATUS

(71) Applicant: HUAWEI TECHNOLOGIES CO., LTD., Guangdong (CN)

(72) Inventors: Weimin Wu, Wuhan (CN); Yuanyuan Peng, Wuhan (CN); Jian Yu, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/992,339

(22) Filed: Aug. 13, 2020

(65) Prior Publication Data

US 2020/0374872 A1 Nov. 26, 2020

Related U.S. Application Data

(63) Continuation of application No. PCT/CN2018/107873, filed on Sep. 27, 2018.

(30) Foreign Application Priority Data

Feb. 14, 2018 (CN) .......................... 201810153339.3

(51) Int. Cl.
*H04L 7/00* (2006.01)
*H04W 72/04* (2009.01)
(Continued)

(52) U.S. Cl.
CPC ...... *H04W 72/0433* (2013.01); *H04B 7/0695* (2013.01); *H04B 7/088* (2013.01); *H04W 72/046* (2013.01); *H04W 72/082* (2013.01)

(58) Field of Classification Search
CPC ........... H04W 72/0433; H04W 72/046; H04W 72/082; H04B 7/0695; H04B 7/088
(Continued)

(56) References Cited

U.S. PATENT DOCUMENTS

2013/0143583 A1* 6/2013 Son .................. H04W 72/0406
455/452.2
2016/0029404 A1 1/2016 Aryafar et al.
(Continued)

FOREIGN PATENT DOCUMENTS

CN 102938666 A 2/2013
CN 103384382 A 11/2013
(Continued)

OTHER PUBLICATIONS

IEEE Std 802.3-2015, IEEE Standard for Ethernet, IEEE Computer Society, Sponsored by the LAN/MAN Standards Committee, Approved Sep. 3, 2015, 4017 pages.
(Continued)

*Primary Examiner* — Tesfaldet Bocure

(57) ABSTRACT

Embodiments of this application disclose a data transmission method and a related apparatus. The method in the embodiments of this application includes: obtaining a set of link information and a set of indication information of at least two links, where the link information is used to indicate a sender of a radio frame transmitted on a link, a receiver of the radio frame, and a transmission time interval of the radio frame, the indication information is used to indicate whether the receiver successfully receives the radio frame transmitted on the link, and transmission time intervals of radio frames transmitted on all of the at least two links have an overlapping target time interval; and determining a target link group based on the set of link information and the set of indication information of the at least two links.

9 Claims, 11 Drawing Sheets

(51) Int. Cl.
*H04B 7/06* (2006.01)
*H04B 7/08* (2006.01)
*H04W 72/08* (2009.01)

(58) Field of Classification Search
USPC .................. 375/267, 299, 347, 358; 370/254
See application file for complete search history.

(56) References Cited

U.S. PATENT DOCUMENTS

2016/0128090 A1* 5/2016 Azarian Yazdi ...... H04L 1/1887
370/329
2017/0201314 A1 7/2017 Grace

FOREIGN PATENT DOCUMENTS

| | | |
|---|---|---|
| CN | 104868947 A | 8/2015 |
| CN | 106465409 A | 2/2017 |
| CN | 107041006 A | 8/2017 |
| WO | 2015189576 A1 | 12/2015 |

OTHER PUBLICATIONS

Xu Yansong: "Coordinated Beamforming for Multi-cell Interference Mitigation", Shanghai Jiao Tong University for Master Degree, Online Publication Period: Mar. 2016. with English abstract. Total 72 pages.

* cited by examiner

DATA TRANSMISSION METHOD AND RELATED APPARATUS

CROSS-REFERENCE TO RELATED APPLICATIONS

This application is a continuation of International Application No. PCT/CN2018/107873, filed on Sep. 27, 2018, which claims priority to Chinese Patent Application No. 201810153339.3, filed on Feb. 14, 2018. The disclosures of the aforementioned applications are incorporated herein by reference in their entireties.

STATEMENT OF JOINT RESEARCH AGREEMENT

The subject matter and the claimed invention were made by or on the behalf of Huazhong University of Science and Technology, of No. 1037 Luoyu Road hongshan Wuhan, Hubei 430074, P.R. China and Huawei Technologies Co., Ltd., of Shenzhen, Guangdong Province, P.R. China, under a joint research agreement titled "Research Project on Key Technologies of Next Generation Wi-Fi Interference Management and Radio Resource Management". The joint research agreement was in effect on or before the claimed invention was made, and the claimed invention was made as a result of activities undertaken within the scope of the joint research agreement.

TECHNICAL FIELD

The present invention relates to the communications field, and in particular, to a data transmission method and a related apparatus.

BACKGROUND

In a multiple-antenna system, an access point (AP) and a station (STA) may form a directional beam through beamforming, to improve a network transmission rate. A prerequisite for beamforming is that channel information needs to be known. For example, for transmit beamforming, the access point needs to perform channel sounding to obtain channel information fed back by the station. A huge amount of channel feedback information usually causes heavy overheads.

To resolve a problem of cell-edge interference, coordinated beamforming (CoBF) between a plurality of cells is further introduced in a wireless communications system. The CoBF has a higher requirement for channel information. The access point not only needs to learn of a channel between the access point and a station in a cell of the access point, but also needs to learn of a channel between the access point and a station in a neighboring cell, to perform beamforming jointly. Then, interference to the neighboring cell is avoided while a beam is aligned with a target receive end. For example, referring to FIG. 1, a process in which a current access point obtains channel information may be as follows: A first access point (for example, an AP 1) sends a null data packet announcement (NDPA) and a null data packet (NDP), where the NDP is used by a first station and a second station to obtain information about a channel between the first access point, and the first station and the second station. A second access point (for example, an AP 2) sends an NDP, where the NDP is used by the first station and the second station to obtain information about a channel between the second access point, and the first station and the second station. Then, the first station and the second station feedback channel statuses to the first access point and the second access point respectively through corresponding beamforming reports (BF Report).

In a current channel sounding process, a channel status is obtained in a form of a beamforming report, resulting in heavy information transmission overheads.

SUMMARY

Embodiments of this application provide a data transmission method and a related apparatus. The method may be applied to a communications system, and the communications system includes an access controller (or a master access point), a plurality of access points, and a station associated with each of the plurality of access points. The access controller (or the master access point) may be connected by wire to the plurality of access points, to reduce air interface overheads. The access controller may determine, based on obtained historical information, links between which interference is less than a threshold, to perform beam pairing on these links, thereby reducing overheads of transmission information for reporting a channel status.

According to a first aspect, an embodiment of this application provides a data transmission method.

An access controller (or a master access point) obtains historical information, where the historical information is a set of link information and a set of indication information of at least two links. A link in this example is a link between an access point and a station. The link information is used to indicate a sender of a radio frame transmitted on a link, a receiver of the radio frame, and a transmission time interval of the radio frame. The transmission time interval may be indicated by a start moment and an end moment of transmitting the radio frame, or the transmission time may be indicated by a start moment of transmitting the radio frame and a data length. The indication information is used to indicate whether the receiver successfully receives the radio frame transmitted on the link. Transmission time intervals of radio frames transmitted on all of the at least two links have an overlapping target time interval. In other words, the transmission time intervals of the radio frames on all of the at least two links may partially overlap or entirely overlap. The access controller may determine a target link group based on the received historical information, namely, the set of link information and the set of indication information of the at least two links, where the target link group includes target links that are in the at least two links and for which the indication information indicates that the receiver successfully receives radio frames transmitted on the links. The access controller (or the master access point) may determine, in a same time period based on the set of link information and the set of indication information, on which link a station fails to receive a radio frame sent by an access point, that is, in a process of receiving the radio frame sent by the access point, the station on the link is interfered with by a radio frame sent by another access point; and on which link the station successfully receives a radio frame sent by the access point, that is, in a process of receiving the radio frame sent by the access point, the station on the link is not interfered with by a radio frame sent by another access point. In comparison with a beamforming report in a conventional method, feedback amounts of link information and indication information are substantially reduced, and information overheads of channel detection are greatly reduced.

In a possible implementation, after determining which target links are beams to be paired, the access controller may schedule a sender on each target link in the target link group to send data to a receiver on the respective link within a same time interval by using a precoding matrix corresponding to the transmission time interval. In the historical information, interference between target links is less than a threshold when the sender on the target link uses the precoding matrix to send a radio frame. Therefore, at a current moment or a future moment, the access controller may schedule the sender on each target link in the target link group to send the data to the receiver on the respective link within the same time interval by using the precoding matrix corresponding to the transmission time interval.

In a possible implementation, when downlink data is to be transmitted, that is, when the sender is an access point and the receiver is a station, the access controller may schedule an access point on each target link in the target link group to send data to a station on the respective link within the same time interval by using the precoding matrix corresponding to the transmission time interval.

In a possible implementation, when uplink data is to be transmitted, that is, when the sender is a station and the receiver is an access point, the access controller may schedule an access point on each target link in the target link group to trigger, within the same time interval, a station on the respective link to send data to the access point by using the precoding matrix corresponding to the transmission time interval.

In a possible implementation, when downlink data is to be transmitted, that is, when the sender is an access point and the receiver is a station, the indication information is used to indicate whether the access point successfully receives acknowledgement information fed back by the station, when the access point sends data to the corresponding station.

In a possible implementation, when uplink data is to be transmitted, that is, when the sender is a station and the receiver is an access point, the access controller schedules the access point to send a trigger frame to the station, where the trigger frame is used to instruct the station to send data to the access point; and the access controller receives indication information sent by the access point, where the indication information is used to indicate whether the access point successfully receives the data sent by the station.

According to a second aspect, an embodiment of the present invention provides a data transmission apparatus on an access controller side, and the apparatus has a function actually performed by the access controller in the foregoing method. The function may be implemented by hardware, or may be implemented by executing corresponding software by hardware. The hardware or the software includes one or more modules corresponding to the function.

Specifically, the data transmission apparatus of the access controller includes:

an obtaining module, configured to obtain a set of link information and a set of indication information of at least two links, where the link information is used to indicate a sender of a radio frame transmitted on a link, a receiver of the radio frame, and a transmission time interval of the radio frame, the indication information is used to indicate whether the receiver successfully receives the radio frame transmitted on the link, and transmission time intervals of radio frames transmitted on all of the at least two links have an overlapping target time interval; and a determining module, configured to determine a target link group based on the set of link information and the set of indication information that are of the at least two links and that are obtained by the obtaining module, where the target link group includes target links that are in the at least two links and for which the indication information indicates that the receiver successfully receives radio frames transmitted on the links.

In a possible implementation, the data transmission apparatus of the access controller further includes a scheduling module.

The scheduling module is configured to schedule a sender on each target link in the target link group determined by the determining module to send data to a receiver on the respective link within a same time interval by using a precoding matrix corresponding to the transmission time interval.

In a possible implementation, when the sender is an access point and the receiver is a station, the scheduling module is further configured to schedule an access point on each target link in the target link group to send data to a station on the respective link within the same time interval by using the precoding matrix corresponding to the transmission time interval.

In a possible implementation, when the sender is a station and the receiver is an access point, the scheduling module is further configured to schedule an access point on each target link in the target link group to trigger, within the same time interval, a station on the respective link to send data to the access point by using the precoding matrix corresponding to the transmission time interval.

According to a third aspect, an embodiment of this application provides a computer storage medium, configured to store a computer software instruction used by the foregoing access controller. The computer software instruction includes a program designed for performing the first aspect.

According to a fourth aspect, an embodiment of this application provides a data transmission apparatus on an access controller side, including a memory, a transceiver, and a processor. The memory is configured to store computer-executable program code, and is coupled to the transceiver. The program code includes an instruction, and when the processor executes the instruction, the instruction enables the access controller to execute information or an instruction in the foregoing method.

According to another aspect, an embodiment of this application provides a processor. The processor is coupled to a memory and may execute an instruction to implement the method and the function in the access controller in the foregoing aspect. The memory may be independent of the processor, or the memory may be disposed in the processor.

According to a fifth aspect, an embodiment of this application provides a data transmission method.

An access point generates link information and indication information, where the link information is used to indicate a sender of a radio frame transmitted on a link, a receiver of the radio frame, and information about a transmission time interval of the radio frame, and the indication information is used to indicate whether the receiver successfully receives the radio frame transmitted by the sender. In this embodiment of this application, the access point sends the link information and the indication information to an access controller, where the link information and the indication information are used by the access controller to determine a target link group, the target link group includes at least two target links, the target link group includes target links for which the indication information indicates that the receiver successfully receives radio frames transmitted on the links, and transmission time intervals of radio frames transmitted on all of the target links in the target link group have an overlapping target time interval, that is, the target link group may be used to perform beamforming pairing, and interference between beams is less than a threshold.

In a possible implementation, the access point sends a first radio frame to a station, where the indication information is used to indicate whether the station successfully receives the first radio frame sent by the access point. If the indication information indicates that the station successfully receives the first radio frame sent by the access point, it may be understood that in a process of receiving the first radio frame, the station is not interfered with by a radio frame sent by another access point (an access point that is not associated with the station). If the indication information indicates that the station fails to receive the first radio frame sent by the access point, it may be understood that in a process of receiving the first radio frame, the station is interfered with by a radio frame sent by another access point (an access point that is not associated with the station).

In a possible implementation, the access point sends a trigger frame to a station, where the trigger frame is used to trigger the station to send a second radio frame to the access point, and the indication information is used to indicate whether the access point successfully receives the second radio frame sent by the station. If the indication information indicates that the access point successfully receives the second radio frame sent by the station, it may be understood that in a process of receiving the second radio frame sent by the station, the access point is not interfered with by a radio frame sent by another non-associated station. If the indication information indicates that the access point fails to receive the second radio frame sent by the station, it may be understood that in a process of receiving the second radio frame sent by the station, the access point is interfered with by a radio frame sent by another non-associated station.

According to a sixth aspect, an embodiment of this application provides a computer storage medium, configured to store a computer software instruction used by the foregoing access point. The computer software instruction includes a program designed for performing the fifth aspect.

According to a seventh aspect, an embodiment of this application provides a data transmission apparatus on an access point side, and the apparatus has a function actually performed by the access point in the foregoing method. The function may be implemented by hardware, or may be implemented by executing corresponding software by hardware. The hardware or the software includes one or more modules corresponding to the function.

Specifically, the data transmission apparatus includes:

a generation module, configured to generate link information and indication information, where the link information is used to indicate a sender of a radio frame transmitted on a link, a receiver of the radio frame, and information about a transmission time interval of the radio frame, and the indication information is used to indicate whether the receiver successfully receives the radio frame transmitted by the sender; and a sending module, configured to send the link information generated by the generation module to an access controller, where the link information is used by the access controller to determine a target link group based on the link information, the target link group includes at least two target links, the target link group includes target links for which the indication information indicates that the receiver successfully receives radio frames transmitted on the links, and transmission time intervals of radio frames transmitted on all of the target links in the target link group have an overlapping target time interval.

In a possible implementation, the sending module is further configured to send a first radio frame to a station, where the indication information is used to indicate whether the station successfully receives the first radio frame sent by the access point.

In a possible implementation, the sending module is further configured to send a trigger frame to a station, where the trigger frame is used to trigger the station to send a second radio frame to the access point, and the indication information is used to indicate whether the access point successfully receives the second radio frame sent by the station.

According to an eighth aspect, a data transmission apparatus on an access point side in an embodiment of this application includes a memory, a transceiver, and a processor. The memory is configured to store computer-executable program code, and is coupled to the transceiver. The program code includes an instruction, and when the processor executes the instruction, the instruction enables the access point to execute information or an instruction in the foregoing method.

According to still another aspect, an embodiment of this application provides a processor. The processor is coupled to a memory and may execute an instruction to implement the method and the function in the access point in the foregoing aspect. The memory may be independent of the processor, or the memory may be disposed in the processor.

According to a ninth aspect, an embodiment of this application provides a data transmission method.

An access controller obtains historical information, where the historical information is a set of link information and a set of interference information, and the set of link information is used to indicate a link set. One piece of link information in the set of link information indicates that a sender of a radio frame transmitted on a link is a first access point and a receiver of the radio frame is a first station, and indicates a transmission time interval of the radio frame, the first station is associated with the first access point, and transmission time intervals of radio frames transmitted on all links in the link set have an overlapping target time interval. The interference information is used to indicate that signal strength of a radio frame received by a second station is greater than or equal to a threshold within the transmission time interval of the radio frame, and the second station is associated with a second access point. The access controller determines a target link group based on the set of link information and the set of interference information, where the target link group includes links in the link set except an interference link, and the interference link is a link between the second access point and the second station. Target links in the target link group are links between which interference is less than a preset threshold within a historical time interval. Therefore, beamforming pairing may be performed based on the target link group without channel detection in a conventional method. In comparison with a beamforming report in the conventional method, feedback amounts of link information and indication information are substantially reduced, and information overheads of channel detection are greatly reduced.

In a possible implementation, after determining which target links are beams to be paired, the access controller schedules a sender on each target link in the target link group to send data to a receiver on the respective target link within a same time interval by using a precoding matrix corresponding to the transmission time interval. In the historical information, interference between target links is less than a threshold when the sender on the target link uses the precoding matrix to send a radio frame. Therefore, at a current moment or a future moment, the access controller may schedule the sender on each target link in the target link group to send the data to the receiver on the respective link within the same time interval by using the precoding matrix corresponding to the transmission time interval.

According to a tenth aspect, an embodiment of this application provides a computer storage medium, configured to store a computer software instruction used by the foregoing access controller. The computer software instruction includes a program designed for performing the foregoing aspect.

According to an eleventh aspect, an embodiment of this application provides a data transmission apparatus on an access controller side, and the apparatus has a function actually performed by the access controller in the foregoing method. The function may be implemented by hardware, or may be implemented by executing corresponding software by hardware. The hardware or the software includes one or more modules corresponding to the function.

Specifically, the access controller includes an obtaining module and a determining module. The obtaining module is configured to obtain a set of link information and a set of interference information, where the set of link information is used to indicate a link set. One piece of link information in the set of link information indicates that a sender of a radio frame transmitted on a link is a first access point and a receiver of the radio frame is a first station, and indicates a transmission time interval of the radio frame, the first access point is associated with the first station, and transmission time intervals of radio frames transmitted on all links in the link set have an overlapping target time interval. The interference information is used to indicate that signal strength of a radio frame received by a second station is greater than or equal to a threshold within the transmission time interval of the radio frame, and the second station is associated with a second access point. The determining module is configured to determine a target link group based on the set of link information and the set of interference information that are obtained by the obtaining module, where the target link group includes links in the link set except an interference link, and the interference link is a link between the second access point and the second station.

In a possible implementation, the data transmission apparatus further includes a scheduling module, where the scheduling module is configured to schedule a sender on each target link in the target link group determined by the determining module to send data to a receiver on the respective target link within a same time interval by using a precoding matrix corresponding to the transmission time interval.

According to a twelfth aspect, a structure of a data transmission apparatus on an access controller side includes a memory, a transceiver, and a processor. The memory is configured to store computer-executable program code, and is coupled to the transceiver. The program code includes an instruction, and when the processor executes the instruction, the instruction enables the access controller to execute information or an instruction in the foregoing method.

According to still another aspect, an embodiment of this application provides a processor. The processor is coupled to a memory and may execute an instruction to implement the method and the function in the access controller in the foregoing aspect. The memory may be independent of the processor, or the memory may be disposed in the processor.

According to a thirteenth aspect, an embodiment of this application provides a data transmission method.

An access point sends a first radio frame to a station, where the station is associated with the access point. The access point generates link information, where the link information is used to indicate that a sender of the first radio frame is the access point and a receiver of the first radio frame is the station, and indicate a transmission time interval of the radio frame. The access point receives interference information sent by the station, where the interference information is used to indicate that when receiving the first radio frame, the station receives a second radio frame whose signal strength is greater than or equal to a threshold and that is sent by another access point different from the access point. The access point sends the link information and the interference information to an access controller, where the link information and the interference information are used by the access controller to determine a target link group based on the link information and the interference information, the target link group includes links in a link set except an interference link, and the interference link is a link between the access point and the station. Therefore, beamforming pairing may be performed based on the target link group without channel detection in a conventional method. In comparison with a beamforming report in the conventional method, feedback amounts of link information and interference information are substantially reduced, and information overheads of channel detection are greatly reduced.

According to a fourteenth aspect, an embodiment of this application provides a computer storage medium, configured to store a computer software instruction used by the foregoing data transmission apparatus on the access point side. The computer software instruction includes a program designed for performing the foregoing aspect.

According to a fifteenth aspect, an embodiment of this application provides a data transmission apparatus on an access point side, and the apparatus has a function actually performed by the access point in the foregoing method. The function may be implemented by hardware, or may be implemented by executing corresponding software by hardware. The hardware or the software includes one or more modules corresponding to the function.

Specifically, the access point includes: a sending module, configured to send a first radio frame to a target station; a generation module, configured to generate link information, where the link information is used to indicate that a sender of the first radio frame is the access point and a receiver of the first radio frame is the target station, and indicate information about a transmission time interval of the radio frame; and a receiving module, configured to receive interference information sent by the target station, where the interference information is used to indicate that when receiving the first radio frame, the station receives a second radio frame whose signal strength is greater than or equal to a threshold and that is sent by an access point different from the access point. The sending module is further configured to send the link information generated by the generation module and the interference information received by the receiving module to an access controller, where the link information and the interference information are used by the access controller to determine a target link group based on the link information and the interference information, the target link group includes links in a link set except an interference link, and the interference link is a link between the access point and the target station.

According to a sixteenth aspect, a structure of a data transmission apparatus on an access point side includes a memory, a transceiver, and a processor. The memory is configured to store computer-executable program code, and is coupled to the transceiver. The program code includes an instruction, and when the processor executes the instruction, the instruction enables the access point to execute information or an instruction in the foregoing method.

According to still another aspect, an embodiment of this application provides a processor. The processor is coupled to a memory and may execute an instruction to implement the method and the function in the access point in the foregoing aspect. The memory may be independent of the processor, or the memory may be disposed in the processor.

According to a seventeenth aspect, this application provides a data transmission method.

A station receives a radio frame. The station generates interference information when the station detects that signal strength of the radio frame is greater than or equal to a threshold, where the interference information includes a receiver of the radio frame and information about a transmission time interval of the radio frame, and the station is a non-target receiver of the radio frame. When the station detects that the signal strength of the received radio frame is greater than or equal to the threshold, the radio frame received by the station is sent by an access point that is not associated with the station, and the radio frame is an interference frame. Then the station sends the interference information to an access point associated with the station, so that the access point sends the interference information, where the interference information is used to determine a target link group, the target link group includes links in a link set except an interference link, and the interference link is a link between the station and the access point associated with the station.

According to an eighteenth aspect, an embodiment of this application provides a computer storage medium, configured to store a computer software instruction used by the foregoing data transmission apparatus on the station side. The computer software instruction includes a program designed for performing the foregoing aspect.

According to a nineteenth aspect, an embodiment of this application provides a data transmission apparatus on a station side, and the apparatus has a function actually performed by the station in the foregoing method. The function may be implemented by hardware, or may be implemented by executing corresponding software by hardware. The hardware or the software includes one or more modules corresponding to the function.

Specifically, the station includes: a receiving module, configured to receive a radio frame; a generation module, configured to generate interference information when it is detected that signal strength of the radio frame is greater than or equal to a threshold, where the interference information includes a receiver of the radio frame and a transmission time interval of the radio frame; and a sending module, configured to send the interference information generated by the generation module to a target access point, where the interference information is used to determine a target link group, the target link group includes links in a link set except an interference link, and the interference link is a link between the target access point and the station.

According to a twentieth aspect, a structure of a station includes a memory, a transceiver, and a processor. The memory is configured to store computer-executable program code, and is coupled to the transceiver. The program code includes an instruction, and when the processor executes the instruction, the instruction enables the station to execute information or an instruction in the foregoing method.

According to still another aspect, an embodiment of this application provides a processor. The processor is coupled to a memory and may execute an instruction to implement the method and the function in the station in the foregoing embodiment. The memory may be independent of the processor, or the memory may be disposed in the processor.

In the embodiments of this application, an access controller (or a master access point) obtains historical information sent by a plurality of access points, where the historical information may be a set of link information and a set of indication information, or the historical information may be a set of link information and a set of interference information, and the historical information includes information about a plurality of links. The access controller (or the master access point) determines links between which interference is less than a threshold within a same transmission time interval in the plurality of links, and determines the links between which interference is less than the threshold as a target link group. Therefore, beamforming pairing may be performed on target links in the target link group. In comparison with a conventional method, channel detection does not need to be performed to transmit transmission information used for determining a channel status such as a beamforming report with a large feedback amount. In the embodiments of this application, information overheads of channel detection are greatly reduced.

DESCRIPTION OF EMBODIMENTS

Embodiments of this application provide a data transmission method and a related device, to reduce information overheads of channel detection.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments described herein can be implemented in an order other than the order illustrated or described herein. Moreover, the terms "include", "have" and any other variants mean to cover a non-exclusive inclusion, for example, a process, method, system, product, or device that includes a list of steps or units is not necessarily limited to those expressly listed steps or units, but may include other steps or units not expressly listed or inherent to the process, method, system, product, or device.

Figure 1:
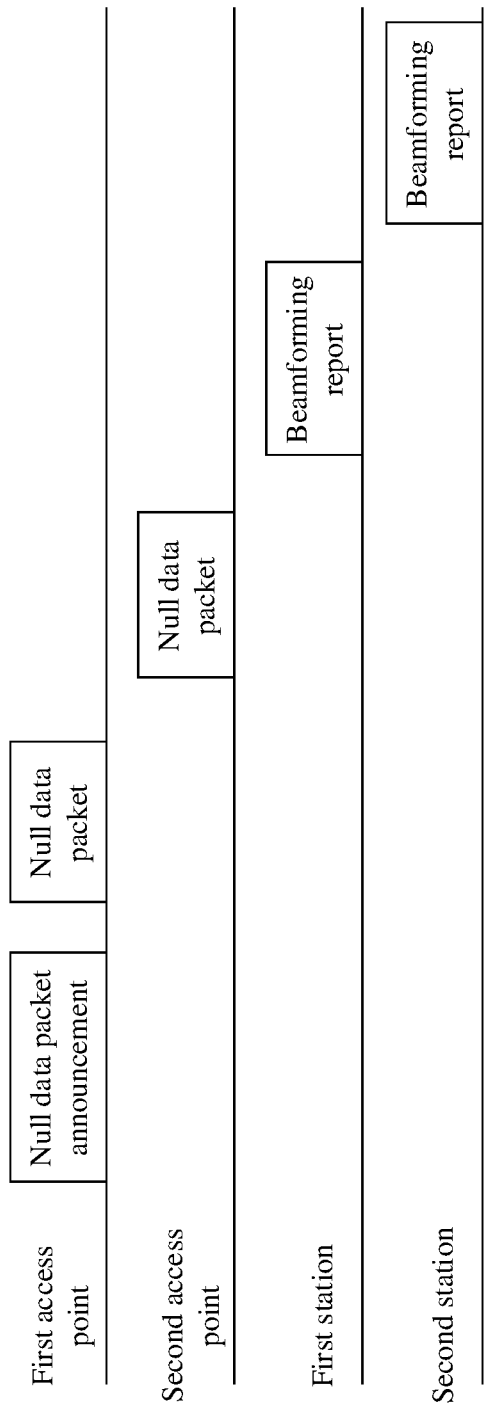
FIG. 1 is a schematic diagram of obtaining channel information in the prior art.
Figure 2:
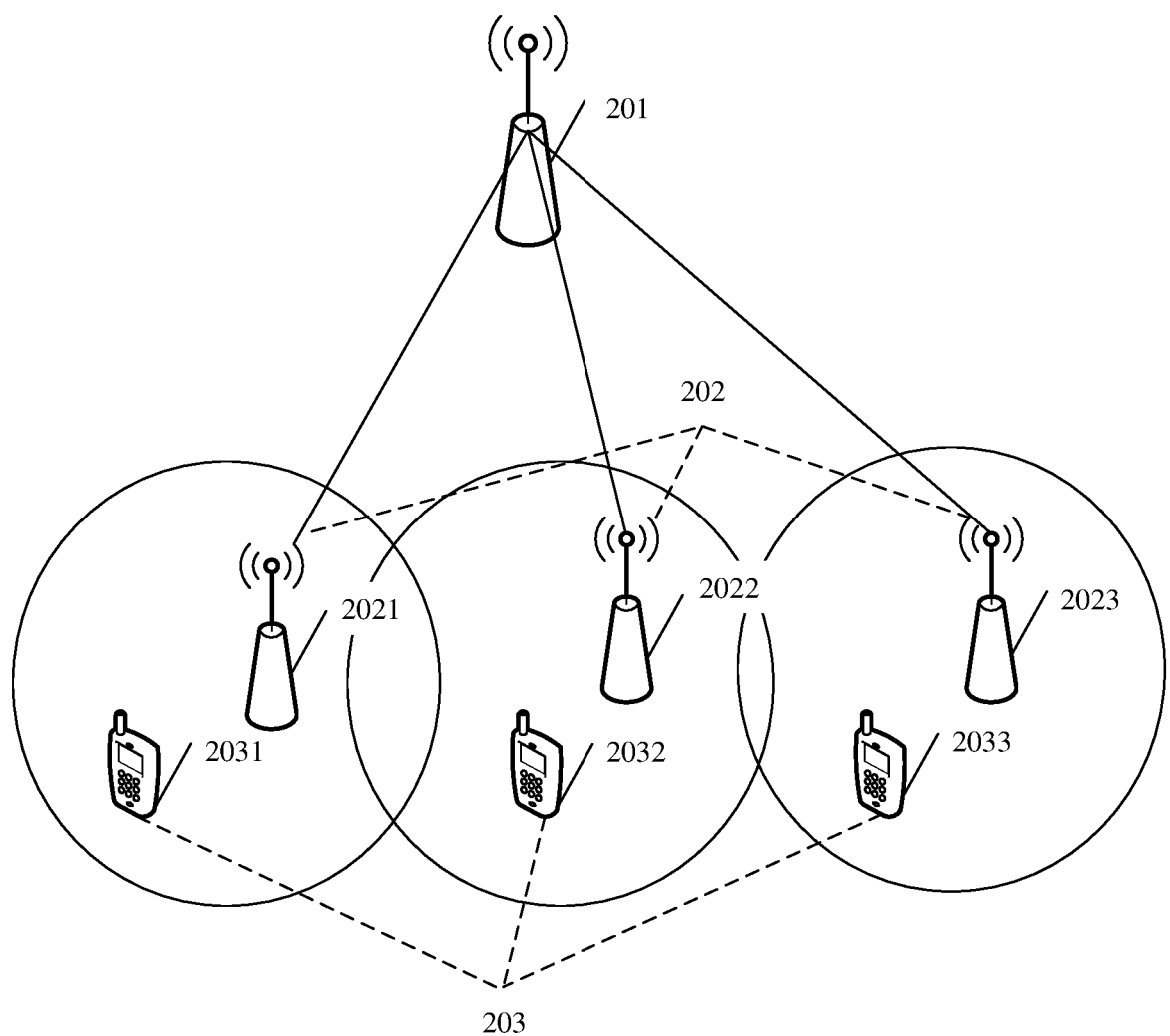
FIG. 2 is a schematic diagram of an example architecture of a communications system according to an embodiment of this application.
Figure 3:
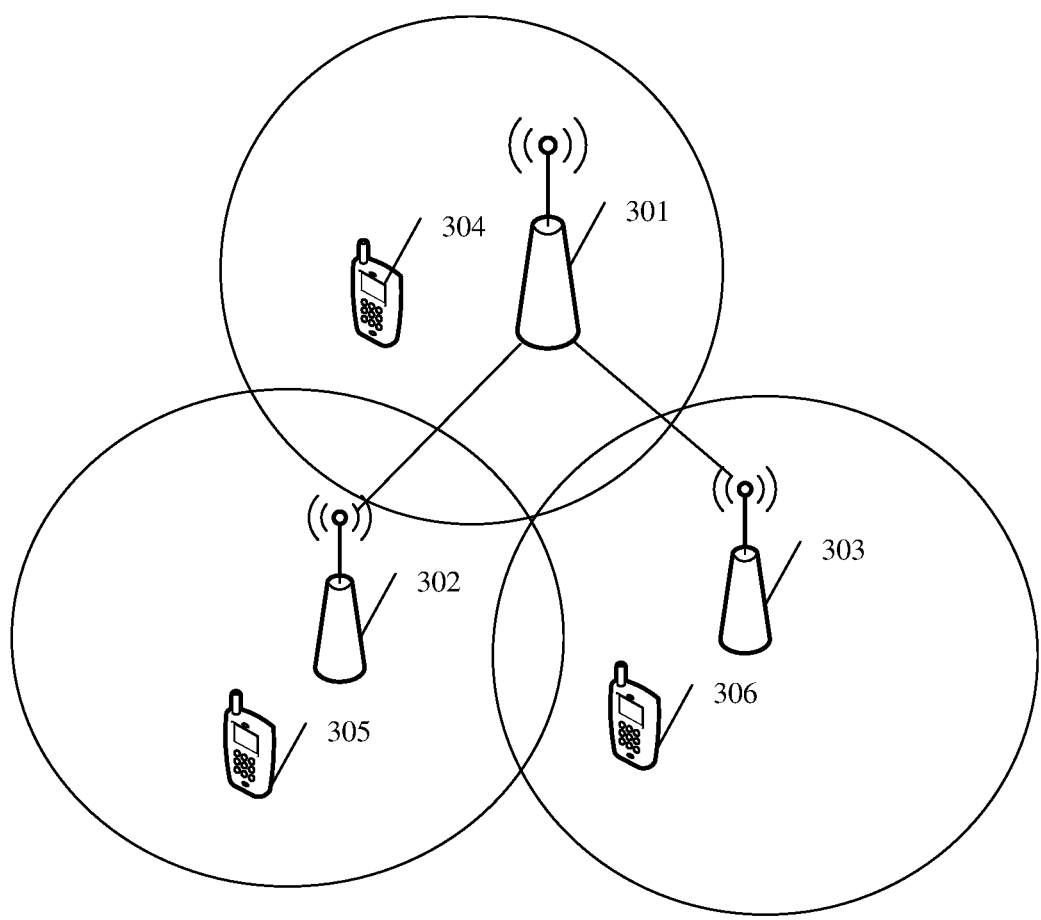
FIG. 3 is a schematic diagram of another example architecture of a communications system according to an embodiment of this application.

The embodiments of this application provide a data transmission method. The method may be applied to a communications system. Referring to FIG. 2 and FIG. 3, FIG. 2 is a schematic diagram of an example architecture of a communications system, and FIG. 3 is a schematic diagram of another example architecture of the communications system. In the architecture illustrated in FIG. 2, the communications system includes an access controller (AC) 201, a plurality of access points 202, and a plurality of stations 203. The access controller 201 is communicatively connected to the plurality of access points 202, and a quantity of access points and a quantity of stations are not limited. In the embodiments of this application, the quantity of access points and the quantity of stations are not limited, and there may be two or more access points and two or more stations. In the embodiments of this application, for example, there are three access points, and there are also three stations. The plurality of access points 202 include a first access point (AP 1) 2021, a second access point (AP 2) 2022, and a third access point (AP 3) 2023, and the plurality of stations 203 include a first station (STA 1) 2031, a second station (STA 2) 2032, and a third station (STA 3) 2033. The first station is associated with the first access point, that is, the first station is a station within a cell range of the first access point. The second station is associated with the second access point, and the third station is associated with the third access point.

A difference between the architecture illustrated in FIG. 3 and the architecture illustrated in FIG. 2 lies in that, in the architecture in FIG. 3, a function of an access controller may be implemented by one of a plurality of access points, and the access point is a master access point (a master AP). The master access point may be an access point designated by the access controller, or an initiator for establishing coordinated transmission between access points, or an access point that obtains a transmit opportunity through channel contention for the first time. In the embodiments of this application, a specific selection manner of the master AP is not limited.

In the communication architecture illustrated in FIG. 3, the communications system includes a first access point (AP 1) 301, a second access point (AP 2) 302, a third access point (AP 3) 303, a first station (STA 1) 304, a second station (STA 2) 305, and a third station (STA 3) 305. The first access point (AP 1) 301 is a master access point, and the master access point is configured to perform a function performed by the access controller in FIG. 2. The first station 304 is associated with the first access point 301, that is, the first station 304 is a station in a cell of the first access point 301. The second station 305 is associated with the second access point 302, that is, the second station 305 is a station in a cell of the second access point 302. The third station 305 is associated with the third access point 303, that is, the third station 305 is a station in a cell of the third access point 303. It should be noted that a quantity of stations associated with one access point is not limited. In the embodiments of this application, for ease of description, for example, each access point is associated with one station.

The communications system in the embodiments of this application is described by using the architecture illustrated in FIG. 2 as an example. In actual application, a specific deployment architecture of the communications system may be the architecture in FIG. 2 or FIG. 3, and is not specifically limited.

The access point in the embodiments of this application may include but is not limited to a communication server, a router, a switch, a bridge, a computer, a mobile phone, a vehicle-mounted communications device, a relay communications module, a base station, and the like. The station may include but is not limited to a mobile phone, a computer, a vehicle-mounted terminal, a personal digital assistant (PDA), and the like. In the embodiments of this application, for example, the access point may be a router, and the station may be a mobile phone.

In an embodiment of this application, an access controller obtains a set of link information and a set of indication information of at least two links. Transmission time intervals of radio frames transmitted on all of the at least two links have an overlapping target time interval.

The set of link information and the set of indication information are historical information received by the access controller. The link information may be used to indicate at least one of a sender of a radio frame transmitted on a link, a receiver of the radio frame, and information about a transmission time interval of the radio frame. The indication information may be used to indicate whether the receiver successfully receives the radio frame transmitted on the link. It may be understood that, whether the receiver successfully receives the radio frame transmitted on the link is: the receiver correctly parses information such as an address of the sender of the radio frame, an address of the receiver, a timestamp, and a data length. The access controller may determine a target link group based on the received historical information. The target link group includes target links that are in the at least two links and for which the indication information indicates that the receiver successfully receives radio frames transmitted on the links. The access controller completes beamforming pairing based on received historical information sent by a plurality of access points. That is, a plurality of target links (beams) between which interference is less than a preset threshold in a same time period may be determined without performing channel detection, so that beamforming pairing can be completed with a relatively small information feedback amount. The following describes this application in detail by using the embodiments.

Figure 4A:
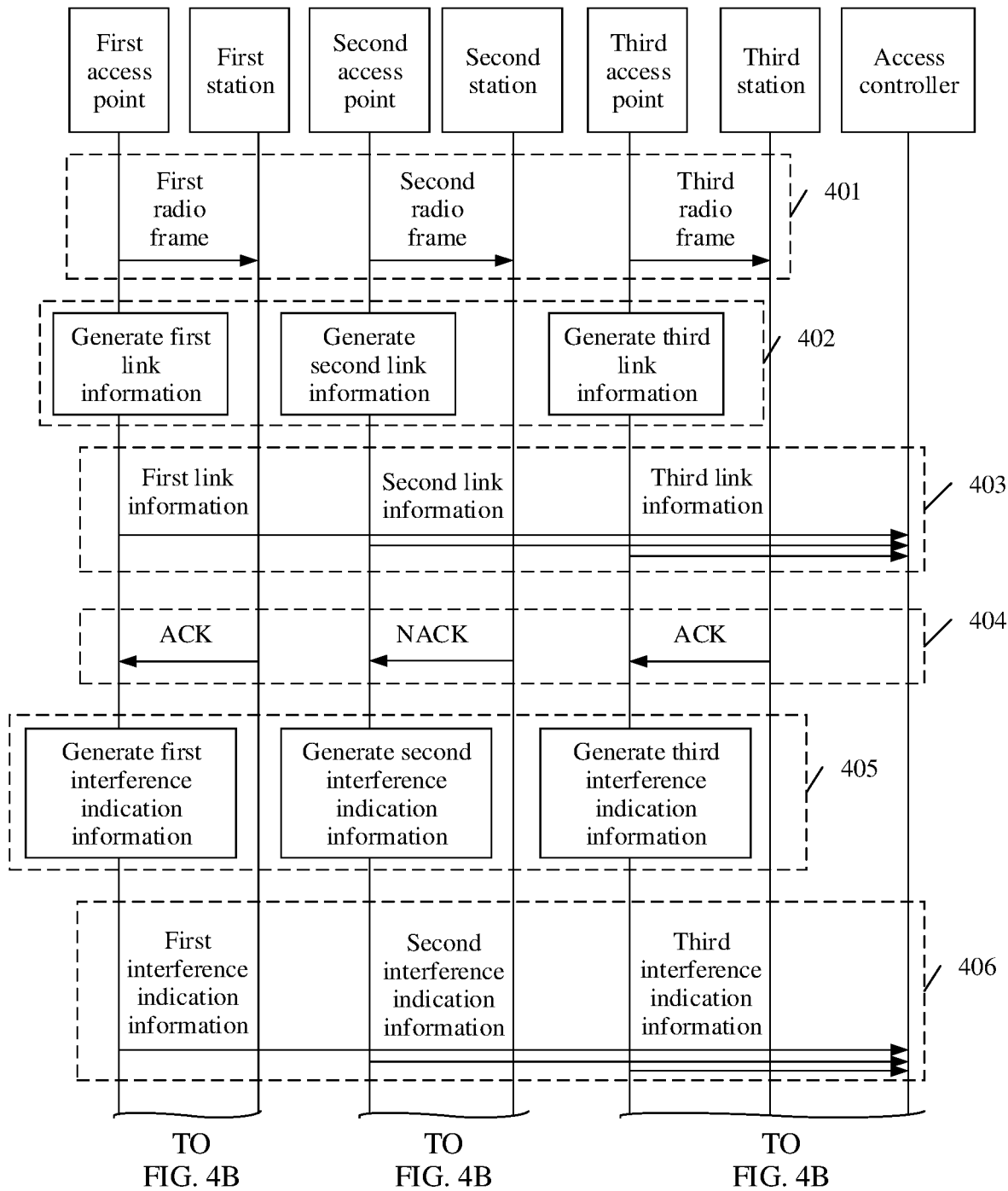
FIG. 4A and FIG. 4B are a schematic flowchart of steps of an embodiment of a data transmission method according to an embodiment of this application.
Figure 4B:
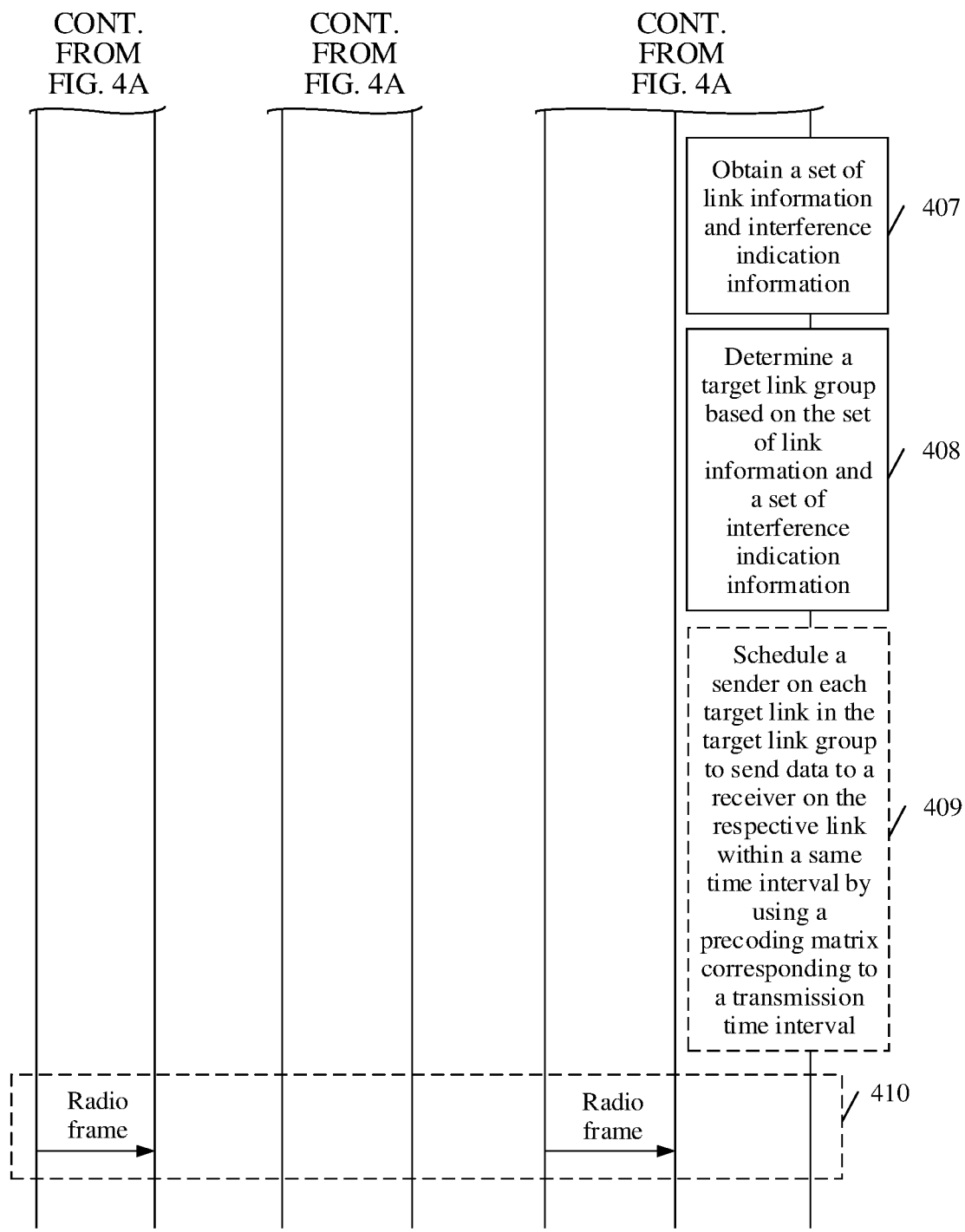

Referring to FIG. 4A and FIG. 4B, the embodiments of this application provide an embodiment of a data transmission method.

In this example, a sender of a radio frame is an access point, and a receiver of the radio frame is a station.

Step 401: An access point sends a radio frame to a station.

A first access point sends a first radio frame to a first station, a second access point sends a second radio frame to a second station, and a third access point sends a third radio frame to a third station.

Step 402: The access point generates link information, where the link information is used to indicate a sender of a radio frame transmitted on a link, a receiver of the radio frame, and a transmission time interval of the radio frame.

A format of the link information is shown in Table 1 below:

TABLE 1

| Category | Transmitter address | Receiver address | Timestamp | Data length | Frame check sequence |
| --- | --- | --- | --- | --- | --- |

The link information includes a transmitter address, a receiver address, a timestamp, a data length, and a frame check sequence (FCS). The transmitter address may indicate the sender of the radio frame (for example, an address of the first access point), the receiver address indicates the receiver of the radio frame (for example, an address of the first station), the timestamp may indicate a moment at which the first access point sends the radio frame to the first station, the data length indicates a length of the radio frame, and the frame check sequence is used by the receiver to determine whether an error occurs in the frame. Information about a transmission time interval of the first radio frame is indicated by the timestamp and the data length. For example, the timestamp is 2018-01-01 08:00:00 (for example, represented by "t0"), an end moment t1 is determined based on the start moment t0 of sending the radio frame and the data length, and t0 and t1 may represent the transmission time interval (t1−t0) of the radio frame.

It should be noted that the link information in Table 1 above is merely an example and does not impose limitation on this application. For example, in another implementation, the timestamp may include a first timestamp and a second timestamp, the first timestamp may indicate the start moment t0 of sending the radio frame, and the second timestamp may indicate the end moment t1 of sending the radio frame. The transmission time interval (t1−t0) of the radio frame may be directly represented by using t0 and t1. In another implementation, the link information may include a transmitter address, a receiver address, a timestamp, and data transmission duration. The timestamp indicates a start moment t0 of transmitting the radio frame, and the transmission time interval (t1−t0) of the radio frame may be indicated by the timestamp and the data transmission duration.

In this example, the first access point generates first link information, the second access point generates second link information, and the third access point generates third link information.

Step 403: The access point sends the link information to an access controller.

Specifically, the first access point sends the first link information to the access controller, the second access point sends the second link information to the access controller, and the third access point sends the third link information to the access controller.

Step 404: The station receives the radio frame, and if the station successfully receives the radio frame, the station feeds back, to the access point, acknowledgment information (for example, an ACK acknowledgment frame) indicating that the radio frame is successfully received; or if the station fails to receive the radio frame, the station does not feed back an ACK or feeds back a negative acknowledgement frame (No ACK, NACK).

The first station receives the first radio frame. If the first station successfully receives the radio frame, the first station feeds back, to the first access point, acknowledgment information (for example, an ACK acknowledgment frame) indicating that the first radio frame is successfully received. If the first station fails to receive the first radio frame, the first station does not feed back an ACK or feeds back a NACK.

It may be understood that interaction between the second station and the second access point and interaction between the third station and the third access point may be understood based on the first station and the first access point. Details are not described herein again.

It should be noted that step 404 may be performed before step 402, or step 404 and step 402 may be simultaneously performed, and a time sequence of step 404 is not limited in this embodiment.

Step 405: The access point generates indication information, where the indication information is used to indicate whether the receiver successfully receives the radio frame transmitted on the link. Specifically, the first access point generates first indication information. The first indication information is used to indicate a case in which the first station receives a radio frame, that is, whether the first station successfully receives the radio frame sent by the first access point.

Step 406: The access point sends the indication information to the access controller.

Specifically, the first access point sends the first indication information to the access controller, the second access point sends second indication information to the access controller, and the third access point sends third indication information to the access controller.

In this example, the access point separately sends the link information and the indication information to the access controller. In another implementation, the link information in step 403 and the indication information in step 406 may be sent to the access controller together. In other words, step 403 may not be performed, and the access point sends feedback information to the access controller in step 406. The feedback information includes the link information and the indication information, and a format of the feedback information is shown in Table 2 below:

TABLE 2

| Category | Transmitter address | Receiver address | Timestamp | Data length | ACK correct receiving | Frame check sequence |
| --- | --- | --- | --- | --- | --- | --- |

Step 407: The access controller receives a set of link information and a set of indication information sent by a plurality of access points, and stores the set of link information and the set of indication information.

The set of link information and the set of indication information are historical information that is sent by the plurality of access points and that is obtained by the access controller.

Specifically, the set of link information includes the first link information sent by the first access point, the second link information sent by the second access point, and the third link information sent by the third access point. The first link information indicates a first link between the first access point and the first station, the second link information indicates a second link between the second access point and the second station, and the third link information indicates a third link between the third access point and the third station.

For example, the transmission time interval that is of transmitting the first radio frame and that is indicated by a timestamp and a data length in the first link information is from a first moment to a fifth moment, a transmission time interval that is of transmitting the second radio frame and that is indicated by a timestamp and a data length in the second link information is from a second moment to the fifth moment, and a transmission time interval that is of transmitting the third radio frame and that is indicated by a timestamp and a data length in the third link information is from the second moment to a fourth moment. In other words, transmission time intervals of radio frames transmitted on all of the three links have an overlapping target time interval. The target time interval may be a partially overlapping time interval. In this example, the partially overlapping target time interval is from the second moment to the fourth moment. In this example, the target time interval may be alternatively an entirely overlapping time interval. In another example, if the transmission time interval of the first radio frame is from the first moment to the fifth moment, the transmission time interval of the second radio frame is from the first moment to the fifth moment, and the transmission time interval of the third radio frame is from the first moment to the fifth moment, the target time interval is an entirely overlapping time interval. It should be noted that, in this example, the transmission time interval is an example for description and does not impose limitation on this application.

The set of indication information includes the first indication information, the second indication information, and the third indication information. For example, the first indication information indicates that the first station successfully receives the first radio frame sent by the first access point, that is, the first indication information indicates that an ACK fed back by the first station is successfully received. The second indication information indicates that the second station fails to receive the second radio frame sent by the second access point, that is, the second indication information indicates that an ACK fed back by the second station fails to be received. The third indication information indicates that the third station successfully receives the third radio frame sent by the third access point, that is, the third indication information indicates that an ACK fed back by the third station is successfully received.

Step 408: The access controller determines a target link group based on a set of link information and a set of indication information of at least two links, where the target link group includes target links that are in the at least two links and for which the indication information indicates that the receiver successfully receives radio frames transmitted on the links.

The second indication information indicates that the second station fails to receive the second radio frame sent by the second access point, indicating that in a process of receiving the second radio frame, the second station is interfered with by a radio frame sent by another access point (the first access point and/or the third access point). Therefore, the access controller adds the second link (a link between the second access point and the second station) to a blacklist.

The first indication information indicates that the first station successfully receives the first radio frame sent by the first access point, and the third indication information indicates that the third station successfully receives the third radio frame sent by the third access point. Therefore, the access controller adds the first link (a link between the first access point and the first station) and the third link (a link between the third access point and the third station) to a whitelist.

The whitelist is used to record the target link group, and a target link included in the target link group recorded in the whitelist is a link on which the station successfully receives a radio frame sent by the sender.

The blacklist is used to record an interference link, that is, a link on which the station fails to receive a radio frame sent by the access point.

It should be noted that, for ease of description, in this embodiment, only three links are used as an example for description. In actual application, a quantity of links recorded in the whitelist and a quantity of links recorded the blacklist are not limited.

In this embodiment, an access controller (or a master access point) obtains historical information sent by at least two access points, where the historical information is a set of link information and a set of indication information, and a link indicated by the link information may be a downlink. The access controller (or the master access point) may determine, in a same time period based on the set of link information and the set of indication information, on which link a station fails to receive a radio frame sent by an access point, that is, in a process of receiving the radio frame sent by the access point, the station on the link is interfered with by a radio frame sent by another access point; and on which link the station successfully receives a radio frame sent by the access point, that is, in a process of receiving the radio frame sent by the access point, the station on the link is not interfered with by a radio frame sent by another access point. In comparison with a beamforming report in a conventional method, feedback amounts of link information and indication information are substantially reduced, and information overheads of channel detection are greatly reduced.

Step 409: The access controller schedules a sender on each target link in the target link group to send data to a receiver on the respective link within a same time interval by using a precoding matrix corresponding to the transmission time interval.

Specifically, the access controller schedules the sender on the target link, and indicates a timestamp at which the sender transmits a radio frame. For example, the first link information includes the first timestamp, and the third link information includes a third timestamp. The access controller sends a joint trigger frame, and the joint trigger frame is used to trigger joint transmission between the first access point and the first station and between the third access point and the third station.

Step 410: The first access point sends a radio frame to the first station by using a precoding matrix corresponding to the first timestamp, and the third access point sends a radio frame to the third station by using a precoding matrix corresponding to the third timestamp.

In this embodiment, in the historical information, there is no interference between the first radio frame transmitted on the first link and the third radio frame transmitted on the third link. Therefore, at a current moment or a future moment, the access controller may schedule the first access point to send the radio frame to the first station by using the precoding matrix corresponding to the first timestamp and the third access point to send the radio frame to the third station by using the precoding matrix corresponding to the third timestamp. A first time interval for transmitting data between the first access point and the first station and a third time interval for transmitting data between the third access point and the third station have an overlapping target time interval. For example, the first time interval is a first moment to a fifth moment, the third time interval is the first moment to a fourth moment, and the target time interval is the first moment to the fourth moment.

Figure 5A:
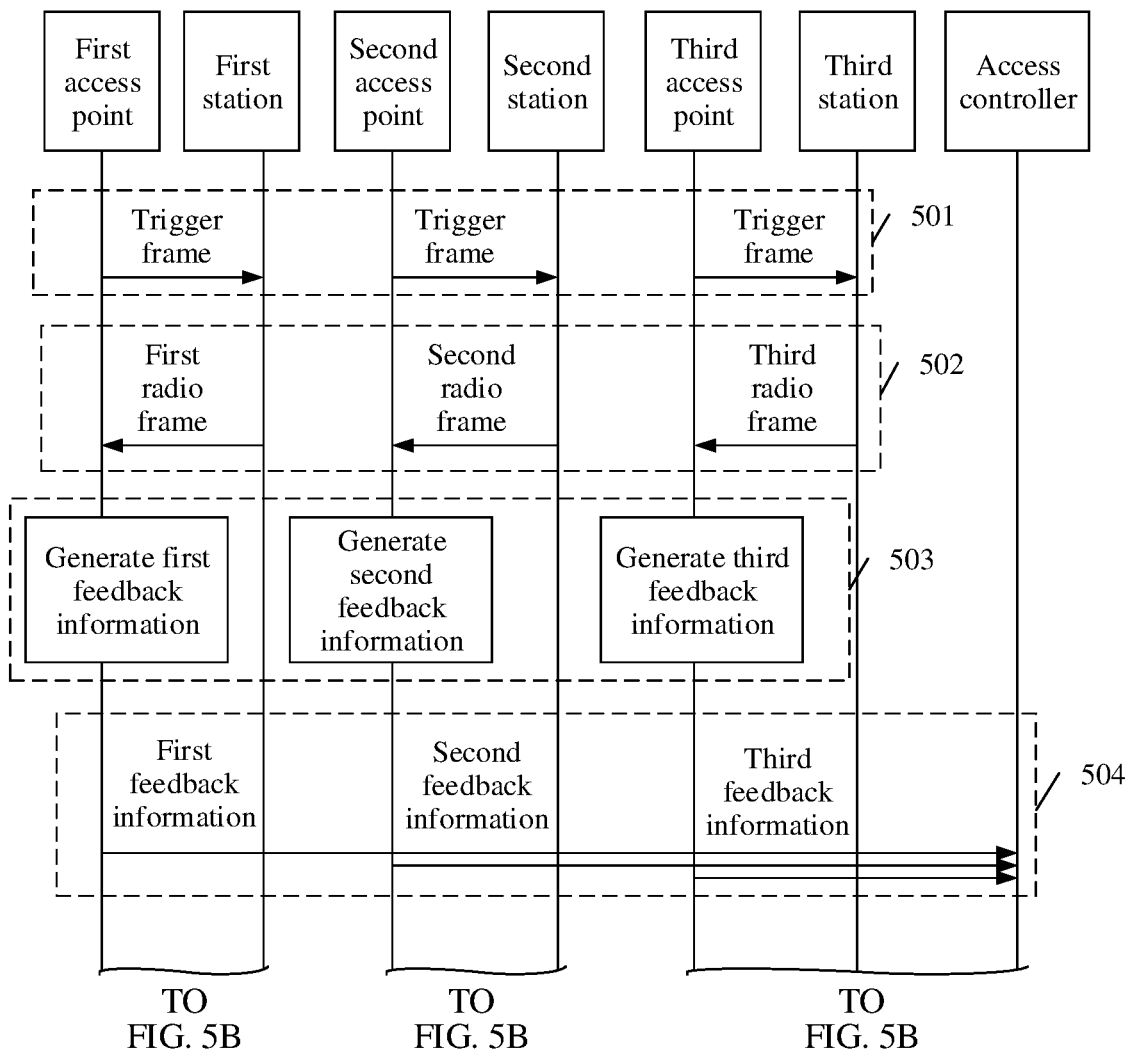
FIG. 5A and FIG. 5B are a schematic flowchart of steps of another embodiment of a data transmission method according to an embodiment of this application.
Figure 5B:
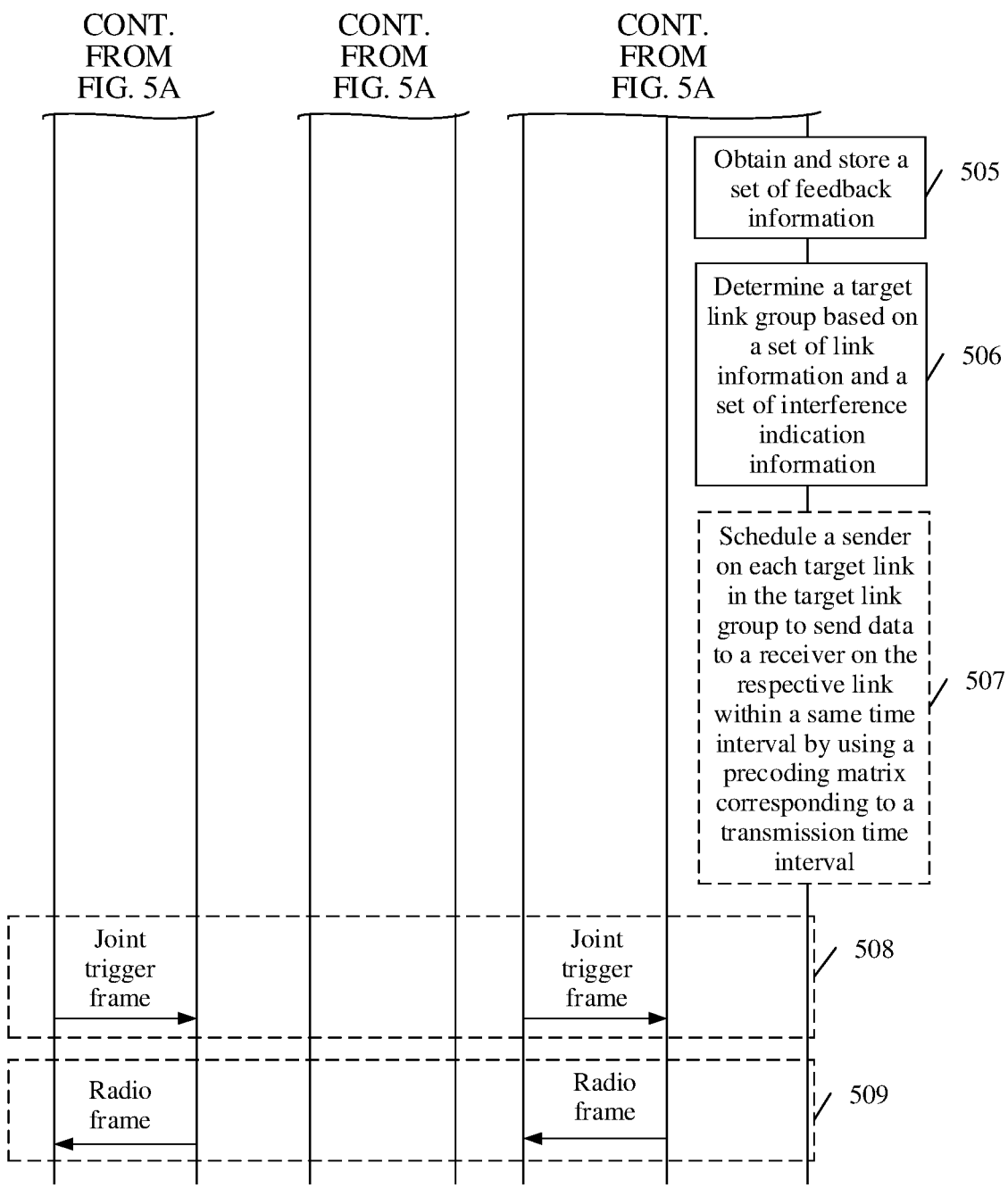

Referring to FIG. 5A and FIG. 5B, the embodiments of this application provide another embodiment of a data transmission method.

A difference between this embodiment and the embodiment corresponding to FIG. 4A and FIG. 4B lies in that a sender of a radio frame is a station, a receiver of the radio frame is an access point, and a target link group is determined through transmission of uplink data.

An access controller jointly schedules a plurality of access points, and each of the plurality of access points sends a trigger frame to a respective station associated with the access point. The trigger frame is used to instruct each station to send a radio frame to a corresponding access point.

Step 501: An access point sends a trigger frame to a station.

Specifically, a first access point sends a trigger frame to a first station, a second access point sends a trigger frame to a second station, and a third access point sends a trigger frame to a third station.

Step 502: The station sends an uplink radio frame to the access point based on the trigger frame.

Specifically, the first station sends a first radio frame to the first access point, the second station sends a second radio frame to the second access point, and the third station sends a third radio frame to the third access point.

Step 503: The access point generates feedback information based on whether the radio frame sent by the station is successfully received, where the feedback information includes link information and indication information. A format of the feedback information may be shown in Table 3 below:

TABLE 3

| Category | Transmitter address | Receiver address | Timestamp | Data length | Correct receiving | Frame check sequence |
| --- | --- | --- | --- | --- | --- | --- |

For example, if the first access point successfully receives the first radio frame sent by the first station, the first access point generates first feedback information. In the first feedback information, a bit of a "transmitter address" is an address of the first station, a bit of a "receiver address" is an address of the first access point, and a bit of "correct receiving" is "1", where "1" indicates that data sent by the first station is correctly received. If the second access point fails to receive the second radio frame sent by the second station, the second access point generates second feedback information. In the second feedback information, a "transmitter address", a "receiver address", and a "data length" each are indicated by using a separate bit, and the separate bit indicates "unidentifiable"; a "timestamp" may indicate a moment at which the access point generates the feedback information; and a bit of "correct reception" is "0", indicating that the second access point fails to receive the radio frame. If the third access point successfully receives the third radio frame sent by the third station, the third access point generates third feedback information. In the third feedback information, a bit of a "transmitter address" is an address of the third station, a bit of a "receiver address" is an address of the third access point, and a bit of "correct reception" is "1".

Step 504: The access point sends the feedback information to an access controller.

Specifically, the first access point sends the first feedback information to the controller, the second access point sends the second feedback information to the controller, and the third access point sends the third feedback information to the controller.

Step 505: The access controller receives a set of feedback information sent by a plurality of access points, where the set of feedback information includes a set of link information and a set of indication information; and stores the set of link information and the set of indication information.

For understanding, refer to step 407. Details are not described herein again.

Step 506: The access controller determines a target link group based on a set of link information and a set of indication information of at least two links, where the target link group includes target links that are in the at least two links and for which the indication information indicates that the receiver successfully receives radio frames transmitted on the links.

The second feedback information indicates that the second access point fails to receive the second radio frame sent by the second station, indicating that in a process of receiving the second radio frame, the second access point is interfered with by a radio frame sent by another station (the first station and/or the third station). Therefore, the access controller adds a second link (a link between the second access point and the second station) to a blacklist.

The first feedback information indicates that the first access point successfully receives the first radio frame sent by the first station, and the third feedback information indicates that the third access point successfully receives the third radio frame sent by the third station. Therefore, the access controller adds a first link (a link between the first access point and the first station) and a third link (a link between the third access point and the third station) to a whitelist.

The whitelist is used to record a target link group. A target link included in the target link group recorded in the whitelist is a link on which the access point successfully receives a radio frame sent by the station.

The blacklist is used to record an interference link, that is, a link on which the access point fails to receive a radio frame sent by the station.

Step 507: The access controller schedules a sender on each target link in the target link group to send data to a receiver on the respective link within a same time interval by using a precoding matrix corresponding to the transmission time interval.

For example, the first link and the third link are target links. The access controller schedules the first access point to send the trigger frame to the first station and the third access point to send the trigger frame to the third station. The first station sends the radio frame to the first access point based on the trigger frame sent by the first access point, and the third station sends the radio frame to the third access point based on the trigger frame sent by the third access point.

The access controller schedules the sender on the target link, and indicates a timestamp at which the sender transmits a radio frame. For example, the first feedback information includes a first timestamp, and the third feedback information includes a third timestamp.

Step 508: The first access point sends a joint trigger frame to the first station, and the third access point sends a joint trigger frame to the third station, where the joint trigger frame is used to trigger joint transmission between the first station and the first access point and between the third station and the third access point.

Step 509: The first station sends a radio frame to the first access point by using a first precoding matrix corresponding to the first timestamp, and the third station sends a radio frame to the third access point by using a third precoding matrix corresponding to the third timestamp.

A first access point receives, by using a receive equalization matrix corresponding to the first precoding matrix, the radio frame sent by the first station, and a third access point receives, by using a receive equalization matrix corresponding to the third precoding matrix, the radio frame sent by the third station.

In this embodiment, an access controller (or a master access point) obtains historical information sent by at least two access points, where the historical information is a set of link information and a set of indication information, and a link indicated by the link information may be an uplink. The access controller (or the master access point) may determine, in a same time period based on the set of link information and the set of indication information, on which link an access point fails to receive a radio frame sent by a station, that is, in a process of receiving the radio frame sent by the station, the access point on the link is interfered with by a radio frame sent by another station; and on which link the access point successfully receives a radio frame sent by the station, that is, in a process of receiving the radio frame sent by the station, the access point on the link is not interfered with by a radio frame sent by another station. In comparison with a beamforming report in a conventional method, feedback amounts of link information and indication information are substantially reduced, and information overheads of channel detection are greatly reduced.

Figure 6A:
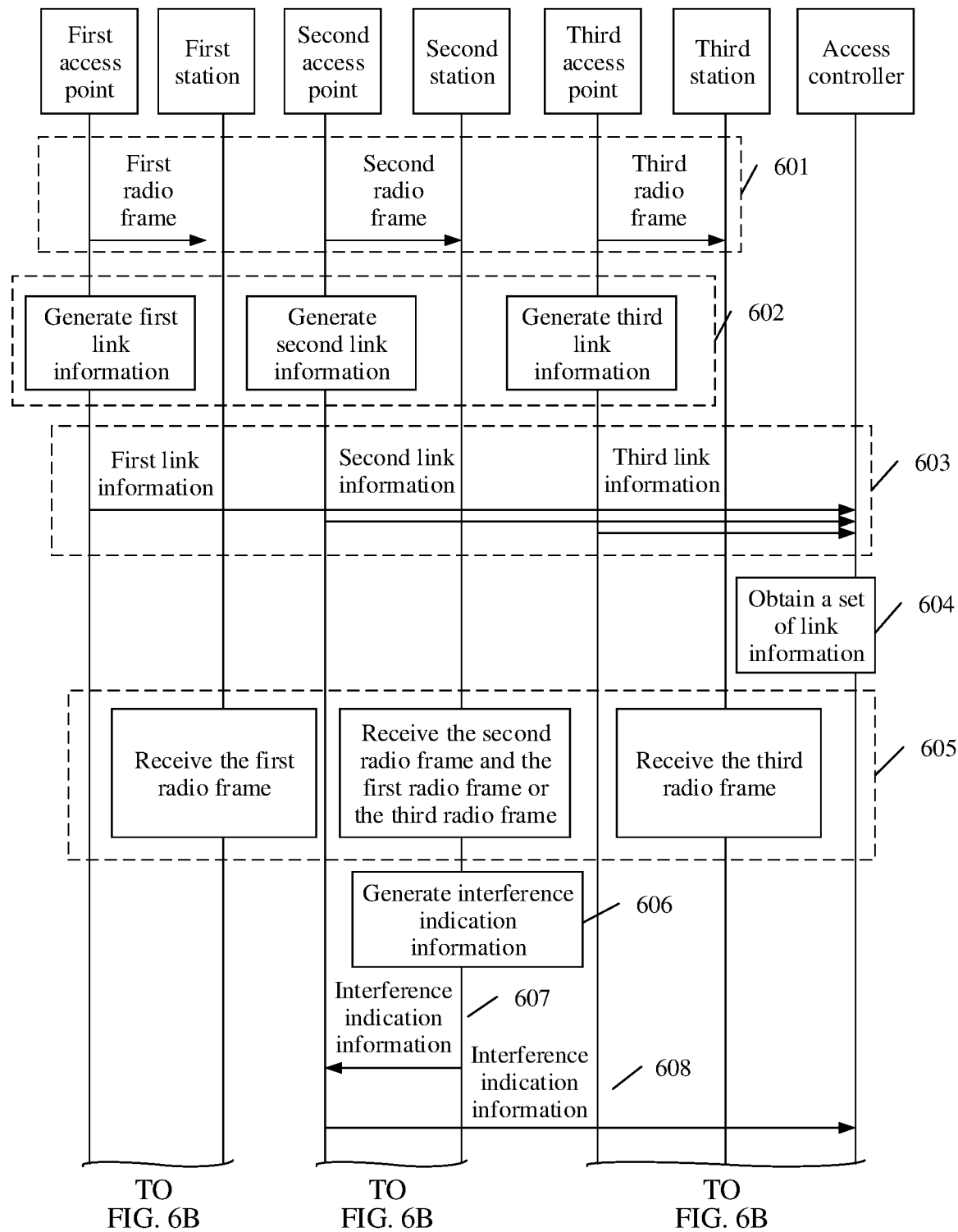
FIG. 6A and FIG. 6B are a schematic flowchart of steps of another embodiment of a data transmission method according to an embodiment of this application.
Figure 6B:
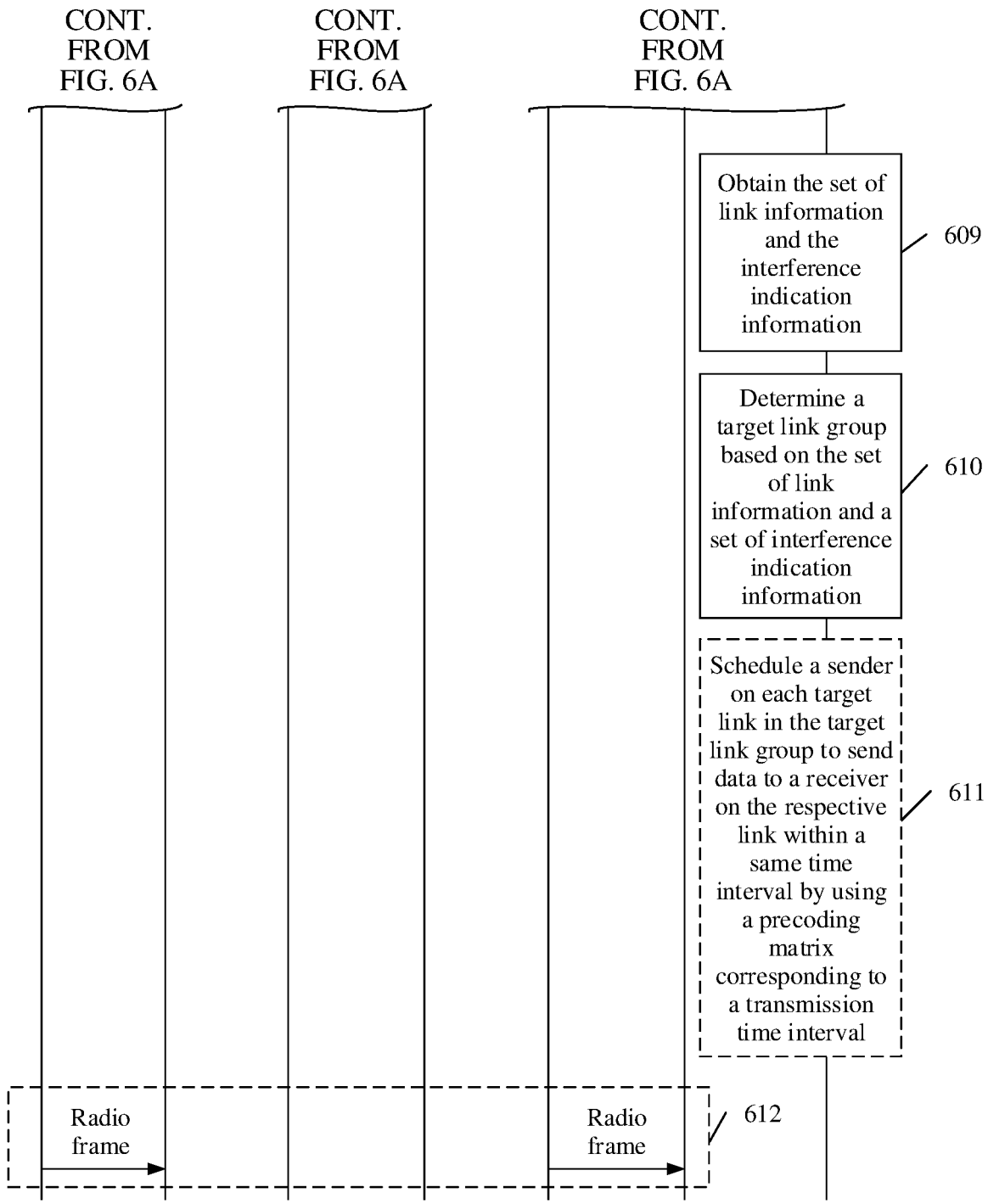

Referring to FIG. 6A and FIG. 6B, the embodiments of this application provide another embodiment of a data transmission method.

Step 601: An access point sends a radio frame to a station in a cell of the access point.

Specifically, a first access point sends a first radio frame to a first station, a second access point sends a second radio frame to a second station, and a third access point sends a third radio frame to a third station.

Step 602: The access point generates link information.

A format of the link information is shown in Table 1, and details are not described herein again.

Specifically, the first access point generates first link information, and the first link information is used to indicate that a sender of the first radio frame is the first access point and a receiver of the first radio frame is the first station, and indicate a first transmission time interval of the radio frame. The second access point generates second link information, and the second link information is used to indicate that a sender of the second radio frame is the second access point and a receiver of the second radio frame is the second station, and indicate a second transmission time interval of the radio frame. The third access point generates third link information, and the third link information is used to indicate that a sender of the third radio frame is the third access point and a receiver of the third radio frame is the third station, and indicate a third transmission time interval of the radio frame.

Step 603: The access point sends the link information to an access controller. Specifically, the first access point sends the first link information to the access controller, the second access point sends the second link information to the access controller, and the third access point sends the third link information to the access controller.

Step 604: The access controller receives a set of link information sent by a plurality of access points.

Specifically, the set of link information includes the first link information, the second link information, and the third link information. The set of link information is used to indicate a link set. The first link information indicates a first link, and the first link is a link between the first access point and the first station. The second link information indicates a second link, and the second link is a link between the second access point and the second station. The third link information indicates a third link, and the third link is a link between the third access point and the third station.

Step 605: The station receives the radio frame.

The first station receives the first radio frame sent by the first access point, the second station receives the second radio frame sent by the second access point, and the third station receives the third radio frame sent by the third access point.

One of the stations may receive a radio frame sent by another access point in addition to a radio frame sent by an access point associated with the station. For example, in addition to the second radio frame, the second station receives the first radio frame sent by the first access point or receives the third radio frame sent by the third access point. If the second station detects that a received signal strength indicator (RSSI) of the received first radio frame (or third radio frame) is greater than or equal to a threshold, it indicates that the received first radio frame (or third radio frame) causes interference to the second station.

It should be noted that step 605 may be performed before step 603, or step 605 and step 603 may be simultaneously performed, and a specific time sequence is not limited.

Step 606: The second station generates interference information, where the interference information is used to indicate that in a transmission time interval of the radio frame, the second station detects that a received signal strength indicator (RSSI) of the first radio frame (or the third radio frame) is greater than a predetermined threshold.

A format of the interference information is shown in Table 4 below:

TABLE 4

| Category | Transmitter address | Receiver address | Timestamp | Data length | RSSI value | Frame check sequence |
| --- | --- | --- | --- | --- | --- | --- |

The second station receives an interference radio frame (the first radio frame or the third radio frame) in addition to the second radio frame. When the second station cannot identify the transmitter address, the "transmitter address" may be indicated by using a special value in the interference information. For example, the transmitter address may be indicated by a broadcast address, or a separate bit is used to indicate that the transmitter address cannot be identified.

The "receive address" is an address of the second station, the "timestamp" and the "data length" are used to indicate a transmission time interval for the second station to receive an interference frame, and the RSSI value may be a specific value detected by the second station. It should be noted that the format of the interference information may not include the RSSI value, provided that the second station generates the interference information, indicating that the RSSI value that is of the interference frame and that is detected by the second station is greater than or equal to the threshold.

Step 607: The second station sends the interference information to the second access point associated with the second station.

Step 608: The second access point receives the interference information sent by the second station, and sends the interference information to the access controller.

It should be noted that step 606 to step 608 are optional steps, and may not be performed, that is, no station receives an interference frame.

Step 609: The access controller receives and stores the set of link information and a set of interference information sent by the plurality of access points.

The set of interference information includes the interference information sent by the second access point. It should be noted that in actual application, the set of interference information may be a null set, that is, no station receives interference information.

In actual application, the set of link information may include a plurality of pieces of link information. In this example, the set of link information includes the first link information, the second link information, and the third link information. The set of interference information includes the interference information sent by the second access point. It should be noted that in this example, the set of link information and the set of interference information are examples for ease of description, and do not impose limitation on this application.

Step 610: The access controller determines a target link group based on the set of link information and the set of interference information, where the target link group includes links in a link set except an interference link, and the interference link is a link between the second access point and the second station.

The set of link information is used to indicate a link set. A first transmission time interval in the first link information in the link set, a second transmission time interval in the second link information, and a first transmission time interval in the third link information have an overlapping target time interval. For example, the first transmission time interval and the third transmission time interval for transmitting data between the third access point and the third station have an intersection. For example, if the first time interval is from a first moment to a fifth moment, the second time interval is from the second moment to a fourth moment, and the third time interval is from the first moment to the fourth moment, the target time interval is from the second moment to the fourth moment.

It may be understood that if the second station receives an interference frame (the first radio frame sent by the first access point or the third radio frame sent by the third access point), it indicates that the second station is interfered with by a radio frame sent by another access point. The interference frame may be the first radio frame sent by the first access point or the third radio frame sent by the third access point. Therefore, in a same time period, if the access controller jointly schedules the first access point and the second access point, the first radio frame sent by the first access point may cause interference to the second station, and if the access controller jointly schedules the third access point and the second access point, the third radio frame sent by the third access point may also cause interference to the second station. The access controller adds an interference link (a link between the second access point and the second station in this example) to a blacklist, and the interference link is a link between a station that receives an interference frame and an access point associated with the station.

The access controller adds links in the link set except the interference link to a whitelist. Links recorded in the whitelist are target links, and transmission time intervals of radio frames on all of the target links in the whitelist have an overlapping part.

Step 611: The access controller schedules a sender on each target link in the target link group to send data to a receiver on the respective target link within a same time interval by using a precoding matrix corresponding to the transmission time interval.

The access controller schedules the sender on the target link, and indicates a timestamp at which the sender transmits a radio frame. For example, the first link information includes a first timestamp, and the third link information includes a third timestamp. The access controller sends a joint trigger frame, and the joint trigger frame is used to trigger joint transmission between the first access point and the first station and between the third access point and the third station.

Step 612: The first access point sends a radio frame to the first station by using a precoding matrix corresponding to the first timestamp, and the third access point sends a radio frame to the third station by using a precoding matrix corresponding to the third timestamp.

In this example, an access controller (or a master access point) stores historical information, where the historical information is a set of obtained link information and a set of interference information, each piece of link information is used to indicate one link, and the set of link information is used to indicate a link set. One piece of link information in the set of link information indicates that a sender of a radio frame transmitted on a link is a first access point and a receiver of the radio frame is a first station, and indicates a transmission time interval of the radio frame. The first access point is associated with the first station, that is, the first station is a station in a cell of the first access point. Transmission time intervals of radio frames transmitted on all links in the link set overlap. The interference information is used to indicate that signal strength of a radio frame received by a second station is greater than or equal to a threshold within the transmission time interval of the radio frame. The second station is associated with a second access point, that is, the second station is a station in a cell of the second access point. The access controller (or the master access point) may determine a target link group based on the set of link information and the set of interference information. The target link group includes links in the link set except an interference link, and the interference link is a link between the second access point and the second station. Target links in the target link group are links between which interference is less than a preset threshold within a historical time interval. Therefore, beamforming pairing may be performed based on the target link group without channel detection in a conventional method. In comparison with a beamforming report in the conventional method, feedback amounts of link information and indication information are substantially reduced, and information overheads of channel detection are greatly reduced.

It should be noted that, in this embodiment of this application, the access controller may be wiredly connected to the first access point, the second access point, and the third access point, to reduce air interface overheads.

This application further provides another embodiment, and this embodiment may include the method corresponding to FIG. 4A and FIG. 4B and the method corresponding to FIG. 6A and FIG. 6B.

It should be noted that "A and/or B" in this embodiment of this application includes three solutions: 1. A; 2. B; 3. A and B.

In this embodiment, an access controller (or a master access point) obtains historical information sent by a plurality of access points, where the historical information may include a set of link information and a set of interference information (for specific obtaining steps, refer to step 401 to step 406 in the method embodiment corresponding to FIG. 4A and FIG. 4B), and/or a set of link information and a set of interference information (for specific obtaining steps, refer to step 601 to step 608 in the method embodiment corresponding to FIG. 6A and FIG. 6B). The access controller (or the master access point) may determine, based on the historical information, a target link group added to a whitelist and/or an interference link added to a blacklist. A target link included in the target link group is: a link on which an access point successfully receives a radio frame sent by a station associated with the access point, and/or a link on which a station fails to receive a radio frame sent by an access point associated with the station, or a link on which a station receives a radio frame that is sent by a non-associated access point and whose signal strength is less than a threshold, and transmission time intervals of target links in the target link group have an overlapping target time interval. The interference link added to the blacklist is a link on which the access point fails to receive the radio frame sent by the station associated with the access point, and/or a link on which the station receives the radio frame that is sent by the non-associated access point and whose signal strength is greater than or equal to the threshold.

In this embodiment, an access controller (or a master access point) obtains historical information sent by a plurality of access points, where the historical information may be a set of link information and a set of indication information, and/or the historical information may be a set of link information and a set of interference information, and the historical information includes information about a plurality of links. The access controller (or the master access point) determines links between which interference is less than a threshold within a same transmission time interval in the plurality of links, and determines the links between which interference is less than the threshold as a target link group. Therefore, beamforming pairing may be performed on target links in the target link group. In comparison with a conventional method, channel detection does not need to be performed to transmit transmission information used for determining a channel status such as a beamforming report with a large feedback amount. In the embodiments of this application, information overheads of channel detection are greatly reduced.

Figure 7:
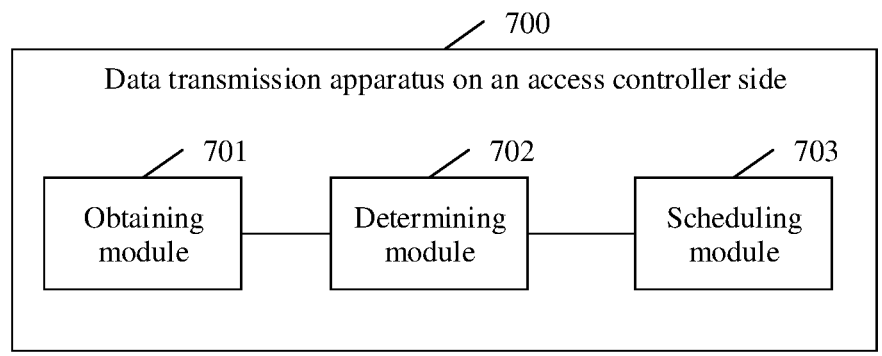
FIG. 7 is a schematic structural diagram of an embodiment of a data transmission apparatus on an access controller side according to an embodiment of this application.

FIG. 7 is a schematic structural diagram of a data transmission apparatus on an access controller side. The embodiments of this application provide an embodiment of a data transmission apparatus 700 on an access controller side.

A structure in FIG. 7 may also be a structure of a master access point. The data transmission apparatus on the access controller side in FIG. 7 is configured to perform the method steps performed by the access controller (or the master access point) in the method embodiments corresponding to FIG. 4A and FIG. 4B, FIG. 5A and FIG. 5B, and FIG. 6A and FIG. 6B.

Specifically, the data transmission apparatus on the access controller side may include:

an obtaining module 701, configured to obtain a set of link information and a set of indication information of at least two links, where the link information is used to indicate a sender of a radio frame transmitted on a link, a receiver of the radio frame, and information about a transmission time interval of the radio frame, the indication information is used to indicate whether the receiver successfully receives the radio frame transmitted on the link, and transmission time intervals of radio frames transmitted on all of the at least two links have an overlapping target time interval; and a determining module 702, configured to determine a target link group based on the set of link information and the set of indication information that are of the at least two links and that are obtained by the obtaining module 701, where the target link group includes target links that are in the at least two links and for which the indication information indicates that the receiver successfully receives radio frames transmitted on the links.

In a possible implementation, the data transmission apparatus on the access controller side further includes a scheduling module 703.

The scheduling module 703 is configured to schedule a sender on each target link in the target link group determined by the determining module 702 to send data to a receiver on the respective link within a same time interval by using a precoding matrix corresponding to the transmission time interval.

In a possible implementation, when the sender is an access point and the receiver is a station, the scheduling module 703 is further configured to schedule an access point on each target link in the target link group to send data to a station on the respective link within the same time interval by using the precoding matrix corresponding to the transmission time interval.

In a possible implementation, when the sender is a station and the receiver is an access point, the scheduling module 703 is further configured to schedule an access point on each target link in the target link group to trigger, within the same time interval, a station on the respective link to send data to the access point by using the precoding matrix corresponding to the transmission time interval.

Based on the structure in FIG. 7, the embodiments of this application further provide another embodiment, the data transmission apparatus on the access controller side includes:

an obtaining module 701, configured to obtain a set of link information and a set of interference information, where the set of link information is used to indicate a link set; one piece of link information in the set of link information indicates that a sender of a radio frame transmitted on a link is a first access point and a receiver of the radio frame is a first station, and indicates a transmission time interval of the radio frame, the first station is associated with the first access point, and transmission time intervals of radio frames transmitted on all links in the link set have an overlapping target time interval; and the interference information is used to indicate that signal strength of a radio frame received by a second station is greater than or equal to a threshold within the transmission time interval of the radio frame, and the second station is associated with a second access point; and a determining module 702, configured to determine a target link group based on the set of link information and the set of interference information that are obtained by the obtaining module 701, where the target link group includes links in the link set except an interference link, and the interference link is a link between the second access point and the second station.

In a possible implementation, the access controller further includes a scheduling module 703.

The scheduling module 703 is configured to schedule a sender on each target link in the target link group determined by the determining module 702 to send data to a receiver on the respective target link within a same time interval by using a precoding matrix corresponding to the transmission time interval.

Figure 8:
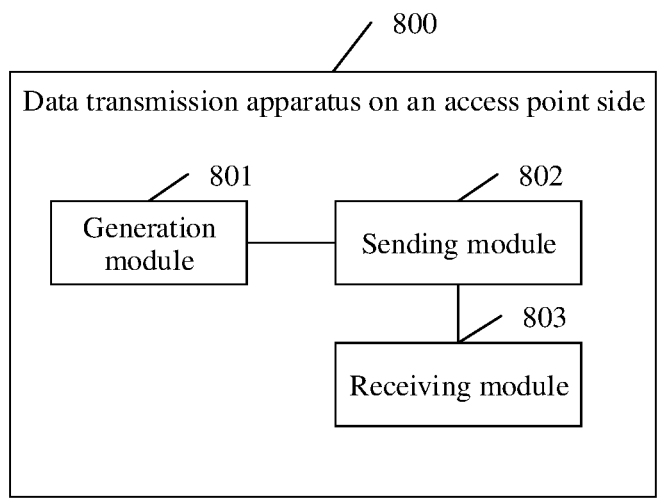
FIG. 8 is a schematic structural diagram of a data transmission apparatus on an access point side according to an embodiment of this application.

FIG. 8 is a schematic structural diagram of a data transmission apparatus on an access point side. The embodiments of this application provide an embodiment of a data transmission apparatus 800 on an access point side.

The data transmission apparatus on the access point side in FIG. 8 is configured to perform the method steps performed by the access point in the foregoing method embodiment.

Specifically, the data transmission apparatus 800 on the access point side may include:

a generation module 801, configured to generate link information and indication information, where the link information is used to indicate a sender of a radio frame transmitted on a link, a receiver of the radio frame, and information about a transmission time interval of the radio frame, and the indication information is used to indicate whether the receiver successfully receives the radio frame transmitted by the sender; and a sending module 802, configured to send the link information generated by the generation module 801 to an access controller, where the link information is used by the access controller to determine a target link group based on the link information, the target link group includes at least two target links, the target link group includes target links for which the indication information indicates that the receiver successfully receives radio frames transmitted on the links, and transmission time intervals of radio frames transmitted on all of the target links in the target link group overlap.

In a possible implementation, the sending module 802 is further configured to send a first radio frame to a station, where the indication information is used to indicate whether the station successfully receives the first radio frame sent by the access point.

In a possible implementation, the sending module 802 is further configured to send a trigger frame to a station, where the trigger frame is used to trigger the station to send a second radio frame to the access point, and the indication information is used to indicate whether the access point successfully receives the second radio frame sent by the station.

Based on the structure in FIG. 8, the embodiments of this application further provide another embodiment.

The data transmission apparatus on the access point side further includes: a receiving module 803;

a sending module 802, configured to send a first radio frame to a station; and a generation module 801, configured to generate link information, where the link information is used to indicate that a sender of the first radio frame is the access point and a receiver of the first radio frame is the station, and indicate information about a transmission time interval of the radio frame.

The receiving module 803 is configured to receive interference information sent by the station, where the interference information is used to indicate that when receiving the first radio frame, the station receives a second radio frame whose signal strength is greater than or equal to a threshold and that is sent by another access point different from the access point.

The sending module 802 is further configured to send the link information generated by the generation module 801 and the interference information received by the receiving module 803 to an access controller, where the link information and the interference information are used by the access controller to determine a target link group based on the link information and the interference information, the target link group includes links in a link set except an interference link, and the interference link is a link between the access point and the target station.

Figure 9:
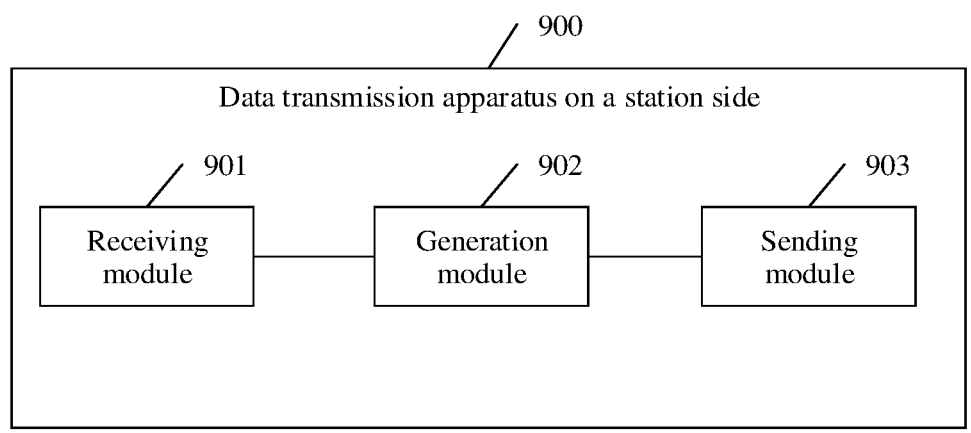
FIG. 9 is a schematic structural diagram of an embodiment of a data transmission apparatus on a station side according to an embodiment of this application.

FIG. 9 is a schematic structural diagram of a data transmission apparatus on a station side. The embodiments of this application provide an embodiment of a data transmission apparatus on a station side, and the apparatus includes:

a receiving module 901, configured to receive a radio frame;

a generation module 902, configured to generate interference information when it is detected that signal strength of the radio frame received by the receiving module 901 is greater than or equal to a threshold, where the interference information includes a receiver of the radio frame and a transmission time interval of the radio frame; and a sending module 903, configured to send the interference information generated by the generation module 902, so that an access point sends the interference information, where the interference information is used to determine a target link group, the target link group includes links in a link set except an interference link, and the interference link is a link between the station and the access point.

Figure 10:
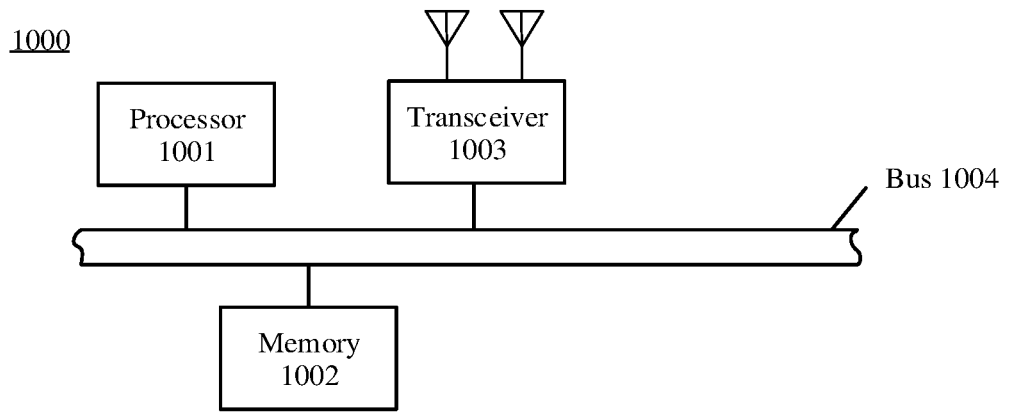
FIG. 10 is a schematic structural diagram of another embodiment of a data transmission apparatus on an access controller side according to an embodiment of this application.

Referring to FIG. 10, the embodiments of this application further provide another embodiment of a data transmission apparatus 1000 on an access controller side.

FIG. 10 is a schematic structural diagram of the data transmission apparatus 1000 according to an embodiment of this application. The data transmission apparatus 1000 may include a processor 1001, a transceiver 1003, and a memory

1002. The memory 1002 may include a read-only memory and a random access memory, and provide an instruction and data for the processor 1001. A part of the memory 1002 may further include a non-volatile random access memory (NVRAM).

The memory 1002 stores the following elements, an executable module or a data structure, or a subset thereof, or an extended set thereof:

an operation instruction: including various operation instructions and used to implement various operations; and an operating system: including various system programs and used to implement various basic services and process hardware-based tasks.

The transceiver 1003 is configured to receive a set of link information and a set of indication information of at least two links, where the link information is used to indicate a sender of a radio frame transmitted on a link, a receiver of the radio frame, and information about a transmission time interval of the radio frame, the indication information is used to indicate whether the receiver successfully receives the radio frame transmitted on the link, and transmission time intervals of radio frames transmitted on all of the at least two links have an overlapping target time interval.

The processor 1001 is configured to determine a target link group based on the set of link information and the set of indication information of the at least two links, where the target link group includes target links that are in the at least two links and for which the indication information indicates that the receiver successfully receives radio frames transmitted on the links.

The processor 1001 is further configured to schedule a sender on each target link in the target link group to send data to a receiver on the respective link within a same time interval by using a precoding matrix corresponding to the transmission time interval.

The processor 1001 controls an operation of the data transmission apparatus 1000, and the processor 1001 may also be referred to as a central processing unit (CPU). The memory 1002 may include a read-only memory and a random access memory, and provide an instruction and data for the processor 1001. A part of the memory 1002 may further include an NVRAM. During specific application, components of the data transmission apparatus 1000 are coupled together through a bus 1004. In addition to a data bus, the bus 1004 may include a power bus, a control bus, a status signal bus, and the like. However, for clear description, various types of buses in the figure are marked as the bus 1004.

The foregoing method disclosed in the embodiments of the present invention may be applied to the processor 1001, or implemented by the processor 1001. The processor 1001 may be an integrated circuit chip and has a signal processing capability. In an implementation process, steps of the foregoing method may be implemented by using an integrated logic circuit of hardware in the processor 1001, or by using an instruction in a form of software. The processor 1001 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor 1001 may implement or perform the methods, the steps, and the logical block diagrams that are disclosed in the embodiments of the present invention. The general purpose processor may be a microprocessor, or the processor may be any conventional processor or the like. The steps of the method disclosed with reference to the embodiments of the present invention may be directly performed and completed through a hardware decoding processor, or may be performed and completed through a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information in the memory 1002, and completes, in combination with hardware in the processor 1001, the method steps performed by the access controller in the method embodiments corresponding to FIG. 4A and FIG. 4B, and FIG. 5A and FIG. 5B.

Based on the structure in FIG. 10, in another embodiment, the storage medium is located in the memory 1002, and the processor 1001 reads information in the memory 1002, and completes, in combination with hardware in the processor 1001, the method steps performed by the access controller in the method embodiment corresponding to FIG. 6A and FIG. 6B.

Specifically, the transceiver 1003 is further configured to obtain a set of link information and a set of interference information, where the set of link information is used to indicate a link set. One piece of link information in the set of link information indicates that a sender of a radio frame transmitted on a link is a first access point and a receiver of the radio frame is a first station, and indicates a transmission time interval of the radio frame, the first station is associated with the first access point, and transmission time intervals of radio frames transmitted on all links in the link set overlap. The interference information is used to indicate that signal strength of a radio frame received by a second station is greater than or equal to a threshold within the transmission time interval of the radio frame, and the second station is associated with a second access point.

The processor 1001 is further configured to determine a target link group based on the set of link information and the set of interference information, where the target link group includes links in the link set except an interference link, and the interference link is a link between the second access point and the second station.

The processor 1001 is further configured to schedule a sender on each target link in the target link group to send data to a receiver on the respective target link within a same time interval by using a precoding matrix corresponding to the transmission time interval.

The processor 1001 is configured to enable the data transmission apparatus on the access controller side to perform the method steps actually performed by the access controller in the method embodiments corresponding to FIG. 4A and FIG. 4B, FIG. 5A and FIG. 5B, and FIG. 6A and FIG. 6B.

Based on the structure in FIG. 10, the storage medium is located in the memory 1002, and the processor 1001 reads information in the memory 1002, and completes, in combination with hardware in the processor 1001, the method steps performed by the access point in the method embodiments corresponding to FIG. 4A and FIG. 4B, and FIG. 5A and FIG. 5B.

Specifically, the processor 1001 is configured to generate link information and indication information, where the link information is used to indicate a sender of a radio frame transmitted on a link, a receiver of the radio frame, and information about a transmission time interval of the radio frame, and the indication information is used to indicate whether the receiver successfully receives the radio frame transmitted by the sender.

The transceiver 1003 is configured to send the link information to an access controller, where the link information is used by the access controller to determine a target link group based on the link information, the target link group includes at least two target links, the target link group includes target links for which the indication information indicates that the receiver successfully receives radio frames transmitted on the links, and transmission time intervals of radio frames transmitted on all of the target links in the target link group overlap.

In a possible implementation, the transceiver 1003 is further configured to send a first radio frame to a station, where the indication information is used to indicate whether the station successfully receives the first radio frame sent by the access point.

In a possible implementation, the transceiver 1003 is further configured to send a trigger frame to a station, where the trigger frame is used to trigger the station to send a second radio frame to the access point, and the indication information is used to indicate whether the access point successfully receives the second radio frame sent by the station.

Based on the structure in FIG. 10, in another embodiment, the storage medium is located in the memory 1002, and the processor 1001 reads information in the memory 1002, and completes, in combination with hardware in the processor 1001, the method steps performed by the access point in the method embodiment corresponding to FIG. 6A and FIG. 6B.

Specifically, the transceiver 1003 is configured to send a first radio frame to a target station.

The processor 1001 is configured to generate link information, where the link information is used to indicate that a sender of the first radio frame is the access point and a receiver of the first radio frame is the target station, and indicate information about a transmission time interval of the radio frame.

The transceiver 1003 is configured to receive interference information sent by the target station, where the interference information is used to indicate that when receiving the first radio frame, the station receives a second radio frame whose signal strength is greater than or equal to a threshold and that is sent by another access point different from a target access point.

The transceiver 1003 is configured to send the link information and the interference information to an access controller, where the link information and the interference information are used by the access controller to determine a target link group based on the link information and the interference information, the target link group includes links in a link set except an interference link, and the interference link is a link between the access point and the target station.

The processor 1001 may also be referred to as a central processing unit (CPU). The memory 1002 may include a read-only memory and a random access memory, and provide an instruction and data for the processor 1001. A part of the memory 1002 may further include an NVRAM. During specific application, components of transmission apparatus 1000 are coupled together through a bus 1004. In addition to a data bus, the bus 1004 may include a power bus, a control bus, a status signal bus, and the like. However, for clear description, various types of buses in the figure are marked as the bus 1004.

Figure 11:
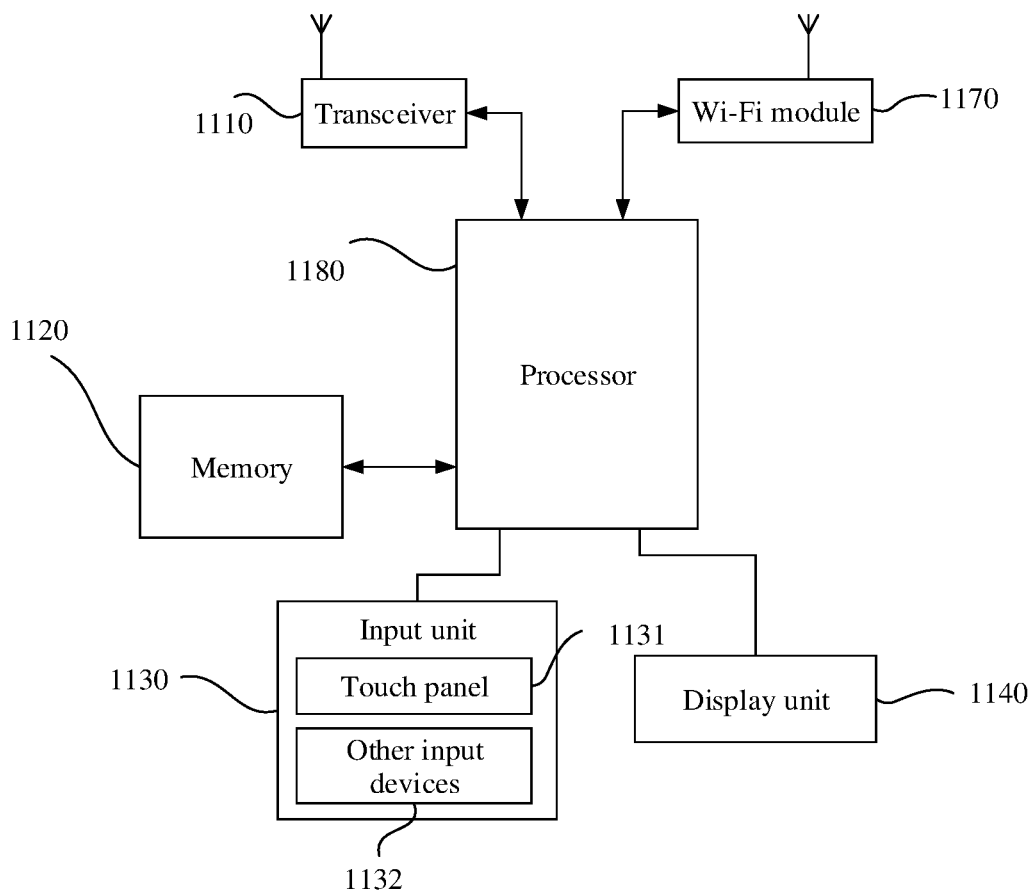
FIG. 11 is a schematic structural diagram of another embodiment of a data transmission apparatus on a station side according to an embodiment of this application.

Referring to FIG. 11, the embodiments of this application further provide another embodiment of a data transmission apparatus on a station side.

The data transmission apparatus on the station side may be a mobile terminal, for example, a mobile phone (or referred to as a "cellular" phone), and a computer that has a mobile terminal. For example, the data transmission apparatus may be a portable, pocket-size, handheld, computer built-in or vehicle-mounted mobile apparatus, which exchanges voice and/or data with a radio access network. For example, the data transmission apparatus may be a device such as a personal communication service (PCS) phone, a cordless telephone set, a session initiation protocol (SIP) phone, a wireless local loop (WLL) station, or a PDA. The data transmission apparatus may also be referred to as a system, a subscriber unit, a subscriber station, a mobile station, a mobile terminal (Mobile), a remote station, a remote terminal, an access terminal, a user terminal, a user agent, a user device, or user equipment.

FIG. 11 is a block diagram of a partial structure of a station according to an embodiment of this application. Referring to FIG. 11, the station includes components such as a transceiver 1110, a memory 1120, an input unit 1130, a display unit 1140, a wireless fidelity (Wi-Fi) module 1170, and a processor 1180. Each component of the data transmission apparatus on the station side is specifically described below with reference to FIG. 11.

The transceiver 1110 may be configured to: receive and send information, or receive and send a signal in a call process.

The memory 1120 may be configured to store a software program and a module, and the processor 1180 runs the software program and the module stored in the memory 1120, to perform various functional applications and process data. The memory 1120 may mainly include a program storage area and a data storage area. In addition, the memory 1120 may include a high-speed random access memory, and may further include a nonvolatile memory.

The input unit 1130 may be configured to: receive entered digital or character information and generate key signal input related to a user setting and function control of the station. Specifically, the input unit 1130 may include a touch panel 1131 and another input device 1132.

The display unit 1140 may be configured to display information entered by a user or information provided for the user, and various menus of the station.

Wi-Fi is a short-range wireless transmission technology. By using the Wi-Fi module 1170, the station may help the user receive and send an email, browse a web page, access streaming media, and the like. The Wi-Fi module 1170 provides wireless broadband Internet access for the user.

The processor 1180 is a control center of the station and is connected to each part of the entire station through various interfaces and lines, and performs various functions of the station and processes data by running or executing the software program and/or the module stored in the memory 1120 and invoking data stored in the memory 1120, to perform overall monitoring on the station.

The transceiver 1110 or the Wi-Fi module 1170 is configured to receive a radio frame.

The memory 1120 is configured to generate interference information when it is detected that signal strength of the radio frame is greater than or equal to a threshold, where the interference information includes a receiver of the radio frame and information about a transmission time interval of the radio frame.

The transceiver 1110 or the Wi-Fi module 1170 is configured to send the interference information to a target access point, so that the target access point sends the interference information to an access controller, where the interference information is used by the access controller to determine a target link group based on the interference information, the target link group includes links in a link set except an interference link, and the interference link is a link between the target access point and the station.

The processor 1180 is configured to enable the data transmission apparatus on the station side to perform the method steps actually performed by the station in FIG. 4A and FIG. 4B, FIG. 5A and FIG. 5B, and FIG. 6A and FIG. 6B. All or some of the foregoing embodiments may be implemented by using software, hardware, firmware, or any combination thereof. When software is used to implement the embodiments, the embodiments may be all or partially implemented in a form of a computer program product.

The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A data transmission apparatus on an access controller side, comprising:
   a processor, and a memory configured to store computer-executable program code, the program code includes an instruction, and when the processor executes the instruction, the instruction enables the apparatus to:
   obtain a set of link information and a set of indication information of at least two links, wherein the link information is used to indicate a sender of a radio frame transmitted on a link, a receiver of the radio frame, and information about a transmission time interval of the radio frame, the indication information is used to indicate whether the receiver successfully receives the radio frame transmitted on the link, and transmission time intervals of radio frames transmitted on all of the at least two links have an overlapping target time interval; and
   determine a target link group based on the set of link information and the set of indication information that are of the at least two links, wherein the target link group comprises target links that are in the at least two links and for which the indication information indicates that the receiver successfully receives radio frames transmitted on the links.

2. The data transmission apparatus according to claim 1, wherein when the processor executes the instruction, the instruction enables the apparatus further to:
   determine a schedule fora sender on each target link in the target link group to, by using a precoding matrix corresponding to the transmission time interval, send data to a receiver on the respective link within a same time interval.

3. The data transmission apparatus according to claim 2, wherein when the sender is an access point and the receiver is a station, when the processor executes the instruction, the instruction enables the apparatus further to: schedule an access point on each target link in the target link group to, by using a precoding matrix corresponding to the transmission time interval, send data to a station on the respective link within the same time interval.

4. The data transmission apparatus according to claim 2, wherein when the sender is a station and the receiver is an access point, when the processor executes the instruction, the instruction enables the apparatus further to: schedule an access point on each target link in the target link group to trigger, within the same time interval, a station on the respective link to send data to the access point by using the precoding matrix corresponding to the transmission time interval.

5. A data transmission apparatus on an access point side, comprising:
   a processor, and a memory configured to store computer-executable program code, the program code includes an instruction, and when the processor executes the instruction, the instruction enables the apparatus to:
   generate link information and indication information, wherein the link information is used to indicate a sender of a radio frame transmitted on a link, a receiver of the radio frame, and information about a transmission time interval of the radio frame, and the indication information is used to indicate whether the receiver successfully receives the radio frame transmitted by the sender; and
   send the link information, wherein the link information is used to determine a target link group, the target link group comprises at least two target links, the target link group comprises target links for which the indication information indicates that the receiver successfully receives radio frames transmitted on the links, and transmission time intervals of radio frames transmitted on all of the target links in the target link group have an overlapping target time interval.

6. The data transmission apparatus according to claim 5, wherein when the processor executes the instruction, the instruction enables the apparatus further to:
   send a first radio frame to a station, wherein the indication information is used to indicate whether the station successfully receives the first radio frame sent by the access point.

7. The data transmission apparatus according to claim 5, wherein when the processor executes the instruction, the instruction enables the apparatus further to:
   send a trigger frame to a station, wherein the trigger frame is used to trigger the station to send a second radio frame to the access point, and
   the indication information is used to indicate whether the access point successfully receives the second radio frame sent by the station.

8. A data transmission apparatus on an access controller side, comprising:
a processor, and a memory configured to store computer-executable program code, the program code includes an instruction, and when the processor executes the instruction, the instruction enables the apparatus to:
obtain a set of link information and a set of interference information, wherein the set of link information is used to indicate a link set; one piece of link information in the set of link information indicates that a sender of a radio frame transmitted on a link is a first access point and a receiver of the radio frame is a first station, and indicates a transmission time interval of the radio frame, the first station is associated with the first access point, and transmission time intervals of radio frames transmitted on all links in the link set have an overlapping target time interval; and the interference information is used to indicate that signal strength of a radio frame received by a second station is greater than or equal to a threshold within the transmission time interval of the radio frame, and the second station is associated with a second access point; and
determine a target link group based on the set of link information and the set of interference information, wherein the target link group comprises links in the link set except an interference link, and the interference link is a link between the second access point and the second station.

9. The data transmission apparatus according to claim 8, wherein when the processor executes the instruction, the instruction enables the apparatus further to:
schedule a sender on each target link in the target link group to send data to, by using a precoding matrix corresponding to the transmission time interval, a receiver on the respective link within a same time interval.

* * * * *